US012758463B2

(12) United States Patent
Ravikumar et al.

(10) Patent No.: US 12,758,463 B2
(45) Date of Patent: Oct. 13, 2026

(54) THERAPEUTIC COMPRESSION SYSTEM AND METHODS OF USE

(71) Applicant: Sun Scientific, Inc., Dobbs Ferry, NY (US)

(72) Inventors: Sundaram Ravikumar, Dobbs Ferry, NY (US); Vikram Ravikumar, New York, NY (US); Guy Osborne, Trumbull, CT (US); Harry Allan Alward, Shelton, CT (US); David Museau, Dobbs Ferry, NY (US)

(73) Assignee: Sun Scientific, Inc., Dobbs Ferry, NY (US)

(*) Notice: Subject to any disclaimer, the term of this patent is extended or adjusted under 35 U.S.C. 154(b) by 668 days.

(21) Appl. No.: 17/608,323

(22) PCT Filed: May 2, 2020

(86) PCT No.: PCT/US2020/031227

§ 371 (c)(1),
(2) Date: Nov. 2, 2021

(87) PCT Pub. No.: WO2020/223721

PCT Pub. Date: Nov. 5, 2020

(65) Prior Publication Data

US 2022/0160574 A1 May 26, 2022

Related U.S. Application Data

(60) Provisional application No. 62/842,165, filed on May 2, 2019.

(51) Int. Cl.
*A61H 9/00* (2006.01)

(52) U.S. Cl.
CPC ... *A61H 9/0078* (2013.01); *A61H 2201/1238* (2013.01); *A61H 2201/165* (2013.01); *A61H 2201/5071* (2013.01); *A61H 2209/00* (2013.01)

(58) Field of Classification Search
CPC ........ A61H 9/0078; A61H 9/005; A61H 9/00; A61H 11/00; A61H 7/00; A61H 2011/005;
(Continued)

(56) References Cited

U.S. PATENT DOCUMENTS 1,300,611 A * 4/1919 Henemier ............... F16K 31/58 152/429
3,067,770 A * 12/1962 Fancher .................. F16K 31/36 137/493
(Continued)

FOREIGN PATENT DOCUMENTS

WO WO-2018052676 A1 * 3/2018 ............. A61F 13/08

*Primary Examiner* — Margaret M Luarca
*Assistant Examiner* — Sarah B Lederer
(74) *Attorney, Agent, or Firm* — Theresa O'Rourke Nugent; Law Office of Theresa O'Rourke Nugent

(57) ABSTRACT

A therapeutic compression system for providing pressure to a limb or other body part, including at least one wrap having at least one bladder and a universal inflation port to connect to an inflation means to the at least one bladder. The inflation port has an open and closed mechanism so that when closed it maintains the level of inflation in the at least one bladder. The inflation means provides either constant or varying pressure within the bladder and a check valve is included in the inflation port and/or inflation means. The inflation means may be connected to a stabilization means configured to be attached to a body part of the user or a belt or other means around for example, the leg or waist or arm of the body. The inflation port connected to the at least one wrap may be self-sealing.

20 Claims, 10 Drawing Sheets

(58) Field of Classification Search
CPC ........... A61B 5/0235; A61F 2007/0091; A61F 5/012; A41D 19/0024; A41D 19/01594
See application file for complete search history.

(56) References Cited

U.S. PATENT DOCUMENTS

| | | | | | |
|---|---|---|---|---|---|
| 3,994,312 | A * | 11/1976 | Tanner | F16K 15/207 | 73/146.8 |
| 7,152,625 | B2 * | 12/2006 | Marvin | A43B 7/085 | 137/854 |
| 2005/0070954 | A1 * | 3/2005 | Johnson | A61H 9/0078 | 606/202 |
| 2006/0135889 | A1 * | 6/2006 | Egli | A63B 22/00 | 600/549 |
| 2006/0189907 | A1 * | 8/2006 | Pick | A61F 5/012 | 602/23 |
| 2007/0249977 | A1 * | 10/2007 | Bonnefin | A61H 9/0078 | 602/13 |
| 2013/0245519 | A1 * | 9/2013 | Edelman | A61H 9/0078 | 601/152 |
| 2014/0058305 | A1 * | 2/2014 | Batterson | A61F 5/0102 | 602/13 |
| 2014/0094726 | A1 * | 4/2014 | Malhi | A61F 13/08 | 601/152 |
| 2014/0276291 | A1 * | 9/2014 | Mansur, Jr. | A61H 9/0078 | 601/152 |
| 2018/0055721 | A1 * | 3/2018 | Quisenberry | A61F 7/007 | |
| 2018/0229064 | A1 * | 8/2018 | Tagami | A63B 69/0059 | |

* cited by examiner 8A 8B 8C 8D 8E 8F

8G

8H

8I

8J

8K

THERAPEUTIC COMPRESSION SYSTEM AND METHODS OF USE

RELATED APPLICATIONS

The present application claim priority from provisional application Ser. No. 62/842,165 filed May 2, 2019 and entitled "Therapeutic Compression System and Methods of Use", the entire contents of which are hereby incorporated herein by reference for all purposes.

BACKGROUND OF THE INVENTION

I. Field of the Invention

The subject invention is directed generally to a system for applying compression to one or more limbs at the same time, and more particularly, to a system for applying compression to the leg and/or thigh of an individual in conjunction with the treatment of conditions such as deep vein thrombosis (DVT), chronic venous insufficiency (CVI) and lymphedema. The system includes at least one therapeutic compression apparatus, such as a wrap having a bladder and an inflation means for the bladder with the apparatus capable of applying compression to a limb such as the full leg, thigh, calf, knee, and/or foot of a patient, and a pump connected to the inflation means.

II. Background of the Related Art

Normally, a healthy muscle, for example, a healthy leg muscle squeezes the deep veins of the legs and feet to help move blood back to the heart. One-way valves in the deep leg veins keep blood flowing back towards the heart. However, prolonged periods of standing or sitting can cause the walls of the deep leg veins to stretch. Over time, in susceptible individuals, this can weaken the vein walls and damage the valves, causing blood to pool in the veins and increase venous blood pressure. This may result in a condition known as chronic venous insufficiency (CVI).

Treatment of CVI typically involves the use of compression stockings or medical hosiery to decrease chronic swelling. Compression stockings are elastic stockings that squeeze the veins to improve venous circulation and prevent excess blood from flowing backward. Compression stockings can also help to heal skin sores or stasis ulcers that often present in conjunction with CVI. It is also common to employ compression bandages to apply pressure to the leg. In this regard, a bandage is applied with constant tension so as to produce graduated compression with the highest pressure at the ankle. However, the technique is difficult and is often done by highly skilled caregivers.

Highly effective mechanical compression devices have also been developed for treating CVI, which are disclosed, for example, in U.S. Pat. Nos. 7,276,037 and 7,559,908, the disclosures of which are incorporated by reference herein in their entireties. These devices include a flexible wrap that carries a manually inflatable air bladder and is adapted to be securely positioned around the leg of an individual to apply localized pressure to a treatment site. Some of these devices also include a fluid-filled wound dressing that can be applied directly to the skin for applying localized pressure and even a medicament to a venous ulcer when it is enveloped by the flexible wrap. While these devices are effective for applying localized compression to the leg, it is not configured to apply localized compression to the thigh of a user or the foot to prevent swelling and further improve venous circulation to the thigh, calf, or whole leg.

Lymphedema, also known as lymphatic obstruction, is another condition of localized fluid retention and tissue swelling, and is caused by a compromised lymphatic system. Treatment for lymphedema varies depending on the severity of the edema and the degree of fibrosis of the affected limb. The most common treatments for lymphedema are manual compression lymphatic massage, compression garments or bandaging. Elastic compression garments are typically worn by persons with lymphedema on the affected limb following complete decongestive therapy to maintain edema reduction.

Compression bandaging, also called wrapping, involves the application of several layers of padding and short-stretch bandages to the involved areas. Short-stretch bandages are preferred over long-stretch bandages (such as those normally used to treat sprains), as the long-stretch bandages cannot produce the proper therapeutic tension necessary to safely reduce lymphedema and may in fact end up producing a tourniquet effect. During activity, whether exercise or daily activities, the short-stretch bandages enhance the pumping action of the lymph vessels by providing increased resistance for them to push against. This encourages lymphatic flow and helps to soften fluid-swollen areas.

Known methods for CVI and lymphedema treatment, like compression bandaging, have several disadvantages. The bandaging is time consuming and the effectiveness is limited to the skill of the provider. In some instances, bandages can be applied too tightly or too loosely and may slip from their intended position, decreasing their effectiveness. When this occurs, bandages must be taken off and reapplied, further increasing the time of application and decreasing the consistency of application of the therapy. Further, when the compression bandaging is on the thigh area of the leg, the bandaging slips down the leg when the user walks or moves around even in bed, possibly due to the anatomical shape of the thigh tapering towards the knee area.

The effectiveness of many of the current compression therapies is limited by the application of current products. Because current compression therapy is done either with manual wraps or electromechanical systems, they require either a skilled medical processional to apply and/or the need for the patient to be stationary for extended periods of time. Although stockings and/or bandages can be worn by patients and self-administered, they are very difficult for the patient to put on and pose a challenge for unskilled medical professionals to apply consistently and effectively. Again though, the stockings and/or bandages will slip down the thigh towards the knee once the user walks or moves around.

CVI and lymphedema may also result in DVT, which is an affliction that causes blood clots particularly in the lower extremities of the legs. When a patient is not ambulatory, the patient faces an elevated risk factor of creating a blood clot. These blood clots, which often accumulate or reside in the patient's calf or thigh, are not, in and of themselves, overly dangerous. However when the blood clot breaks loose, they create a pulmonary embolism which can get lodged in the patient's heart, brain or lungs where it can cause significant damage or death. It is estimated that in each year 2 to 2.5 million Americans are afflicted by DVT causing 600,000 patients to seek medical care with 300,000 patients succumbing to the effects of the pulmonary embolism. Among people who have had a DVT, one-third will have long-term complications (post-thrombotic syndrome) such as swelling, pain, discoloration, and scaling in the affected limb. Further, about one-third (about 33 percent) of people who are diagnosed with blood clots will have a recurrence within ten years. Thus, a system and apparatus and method of use to prevent, reduce and/or treat DVT is needed which is easy to use by the patient at home, ambulatory in that the patient can work and walk about both inside and outside of the home, and less cumbersome than current known DVT systems. DVT can be caused or have an increased risk based on (a) recent surgery, which decreases a patient's mobility and increases inflammation in the body, which can lead to clotting; (b) medical conditions that limit mobility, such as an injury or stroke; (c) long periods of travel, which limit mobility; (d) injury to a deep vein; (e) inherited blood disorders that increase clotting; (f) pregnancy; (g) cancer treatment; (h) smoking; (i) obesity; and (j) many other conditions. Thus, a system and apparatus and method of use to treat DVT is needed.

Many of the current treatment options for CVI and lymphedema cause venous ulcers including the use of current known devices, apparatus, bandages, stocking, hosiery and the like. A venous ulcer is damage and loss of skin above the ankle that is the result of a problem with the veins in the leg. Venous ulcers typically develop on either side of the lower leg, above the ankle and below the calf. They are difficult to heal and often recur. They also develop on the thigh, on the inner portion of the leg thigh or outer thigh area as well as near the groin area on the leg. Further, venous ulcers may develop around the knee, behind the knee, along the sides and on the front of the knee as well.

The veins of the leg are divided into the superficial and deep systems according to their position relative to the fascia. The deep veins, which come together to form the popliteal and femoral veins lie within the fascia and are responsible for the venous return from the leg muscles. Dilated valveless sinusoids also lie within the fascia (more particularly in the soleus and gastrocnemius muscles). The sinusoids fill with blood when the leg is at rest.

The long saphenous vein which runs along the medial side of the leg from foot to groin and the short saphenous vein which runs at the back of the calf from foot to knee are the major vessels of the superficial venous system. These vessels lie outside the fascia and are responsible for the venous return from the skin and subcutaneous fat. Compression on the long saphenous vein may be recommended in treatment of certain conditions whereas in other conditions there may be less compression recommendation on the long saphenous vein on the medial side of the leg and more compression recommended on the short saphenous vein of the leg which runs on the back portion of the leg, including the thigh.

Communicating veins, sometimes called perforators because they perforate the deep fascia, join the two systems. The perforators, like the other veins in the leg, contain valves that permit the flow of blood in one direction only, from the outer or superficial system inwards to the deep veins.

The venous pressure at the ankle of a subject who is lying supine is around 10 mmHg, but on standing this will rise considerably due to an increase in hydrostatic pressure (equivalent to the weight of a vertical column of blood stretching from the point of measurement to the right auricle of the heart).

During walking, as the foot is dorsally flexed, the contraction of the calf muscle compresses the deep veins and soleal sinuses thereby emptying them of blood. As the foot is plantarly flexed, the pressure in the veins falls, the proximal valves close, and the veins are refilled by blood passing through the perforators from the superficial system. During this cycle, in a normal leg, the distal valves of the deep veins and the valves of the perforators will ensure that the expelled blood can go in only one direction—upwards, back to the heart.

Blockage or damage to the venous system will cause disruption to normal blood flow, which may manifest itself in a number of different ways according to the site and extent of the damage. If the valves in the superficial system are affected, venous return will be impaired and blood may accumulate in the veins causing them to become distended, leading to the formation of varicosities (varicose veins). Such varicosities may be located in the thigh, knee, calf, ankle or foot area of the user's leg.

If the function of the perforator valves is impaired, the action of the calf muscle pump will tend to cause blood to flow in the reverse direction into the superficial system increasing the possibility of damage to the superficial vessels. Again, the current compression therapy is done either with manual wraps or electromechanical systems, they require either a skilled medical processional to apply and/or the need for the patient to be stationary for extended periods of time. A need exists for a new system to treat such medical issues There may be minimal blood flow upward into the thigh and the rest of the body, causing issues for the patient along the body including the thigh, calf, ankle and entire leg of the patient.

Following a deep vein thrombosis that results in complete or partial obstruction of a deep vein, the unrelieved pressure produced by the calf muscle pump on the perforator valves may cause these to become incompetent. If this occurs, there will be a large rise in the pressure in the superficial system, which may force proteins and red cells out of the capillaries and into the surrounding tissue. Here, the red cells break down releasing a red pigment that causes staining of the skin, an early indicator of possible ulcer formation. The ulcer formation can be in any part of the body, including the leg, groin, thigh, knee, calf, ankle and foot.

Venous leg ulcers are generally shallow and red in color. The skin surrounding the ulcer is frequently discolored due to the staining described previously. Incompetent perforating vein valves can also cause malleolar venules to become dilated and appear as fine red threads around the ankle as well as the thigh, knee, calf or foot are of the leg or any area of the leg. This condition, called ankle flair, is also diagnostic of a venous ulcer. The condition may also be seen on the thigh, including the inner medial thigh area or outer lateral thigh area, or around the knee or groin area of the patient's body.

Arteries transport oxygen replenished blood from the heart to the rest of the body. Veins return oxygen depleted blood back to the heart. When the veins in the lower extremities of the body have difficulty transporting blood back to the heart, a condition develops called chronic venous insufficiency (CVI), also known as chronic venous disease (CVD). CVI, most commonly occurs as the result of a blood clot in the deep veins of the legs, a disease known as deep vein thrombosis (DVT). CVI also results from pelvic tumors and vascular malformations, and sometimes occurs for unknown reasons. When a person is standing or sitting, blood in the veins of the legs flows in an upward direction. When the person walks, the calf muscles and muscles in the feet contract to squeeze the veins and push the blood upward. To keep the blood flowing upward and prevent it from flowing downward, the veins contain one-way valves. CVI occurs when these valves become damaged and allow the blood to leak back downward in the opposite direction. Such valve damage may occur as the result of aging, extended sitting or standing, or a combination of aging and reduced mobility. When the veins and valves become weakened and the blood does not properly flow up to the heart, blood pressure in the veins of the lower extremities can stay elevated for long periods of time, leading to CVI. This condition is more common in older individuals, and if not properly treated, can lead to burst capillaries, local tissue inflammation, internal tissue damage, varicose veins, ulcers, and open sores on the skin's surface. The burst capillaries can be seen on the patient's leg including the thigh, knee and groin.

CVI can diminish the capacity of the venous system and increase the workload of the lymphatic system in the affected area. The lymphatic system must then transport larger volumes of water and protein to reduce the fluid load in the affected tissues of the legs, a situation which is especially difficult for patients with lymphedema, varicose veins, and other lower extremity pathology.

One non-surgical option often used to help prevent or treat the leg extremity pathologies discussed above is the use of compression stockings. Compression stockings help prevent leg fatigue, ankle and foot swelling, spider veins, and varicose veins. They improve circulation in the legs, especially when used in conjunction with frequent exercise and leg elevation. Compression stockings maintain pressure on the legs while allowing for normal ambulation. Increasing pressure in the tissues beneath the skin reduces excess leakage of fluid from the capillaries and increases absorption of tissue fluid by the capillaries and lymphatic vessels. In addition, the increased pressure decreases the size of the veins, which causes the blood to flow faster and help prevent it from pooling.

Compression stocking tightness typically varies between 15-50 mm HG. The tightness of a given stocking depends on its particular configuration and class. For example, stockings having a compression pressure of 15-20 mm HG are considered light compression stockings. Class I stockings are 20-30 mm Hg, class II stockings are 30-40 mm Hg, and class III stockings are 40-50 mm Hg.

While such compression stockings are a commonly utilized non-invasive treatment of leg pathology, the issues they present are numerous. Wearing a tightly fitting stocking can be tedious or time consuming to put on, and may require help from another person if the wearer is injured, elderly, or has some form of disability. Any tight fitting stocking to be worn on the thigh area has a harder time being put on as the user has to pull the tight fitting stocking over the foot, ankle, calf, knee and finally up to the thigh area. Again, due to the shape of the thigh, these tight fitting stocking will slip down the thigh at some point due to the user walking or moving about.

In addition, the pressure applied by the stocking generally stays relatively constant during use without any option of increasing or decreasing the tightness level. As compression stockings are repeatedly worn, they lose elasticity and thus tightness over time. Once such prescribed elasticity and tightness is lost, the stocking is of little or no value, and needs to be replaced on account of its looseness, which requires buying a new pair to obtain the desired pressure. Further, given the shape of the thigh, the top or upper portion of the stocking must be very tight in order to prevent slippage down the thigh, which can in turn lead to complications of its own due to the excessive tightness.

Medical hosiery represents a useful and convenient method of applying compression to normal shaped legs in order to prevent the development or recurrence of leg ulcers. However, these stockings are of limited value in the treatment of active ulceration, being difficult to apply over dressings. In such situations compression bandages currently represent the treatment of choice. Compression bandages apply a pressure to the limb that is directly proportional to bandage tension but inversely proportional to the radius of curvature of the limb to which it is applied. This means, therefore, that a bandage applied with constant tension to a limb of normal proportions will automatically produce graduated compression with the highest pressure at the knee. This pressure will gradually reduce up the thigh as the circumference increases.

As can be readily appreciated, it is cumbersome and difficult to apply uniform tension to the compression bandage as it is applied to the treated limb, and thus this is accomplished only by highly skilled caregivers. Moreover, once secured to the treated limb, care and attention must be given to ensure that the bandage does not slip or become displaced as this will lead to multiple layers forming, which in turn may lead to localized areas of high pressure, which can place the patient in direct risk of skin necrosis.

Mechanical compression treatments have also been proposed. An exemplary compression device is described in U.S. Pat. No. 5,031,604 to Dye. As generally described at col. 2, lines 33 et seq., an arrangement of chambers are provided that circumscribe the leg. An active pneumatic control system controls the pressure in the chambers to squeeze the leg near the ankle and then squeeze sequentially upward toward the knee in order to move blood from the extremity toward the heart. As noted in col. 4, lines 20-59 of U.S. Pat. No. 6,488,643 to Tumey et al., the mechanically produced compression levels may produce ischaemic (i.e., localized tissue anemia) not noted at similar compression levels obtained through bandaging. It may also produce cuffing (i.e., a reduction in leg pulsatile blood flow). The pneumatic control system is also bulky and heavy, which severely limits the mobility of the patient during treatment. Moreover, the pneumatic control system fails to provide a mechanism to ensure that excessive pressure, which can cause necrosis, is not applied to the treated limb. These limitations have resulted in most mechanical compression devices being contraindicated for patients exhibiting DVT. Consequently, those skilled in the art have to date avoided such mechanical compression devices for the treatment of venous ulcers or edema of the extremities.

DVT is widely recognized as a major risk factor facing patients who undergo total hip arthroplasty (THA) and total knee arthroplasty (TKA). Without prophylaxis (preventive treatment), up to 80 percent of orthopedic surgical patients will develop DVT, and 10 to 20 percent will develop PE. Even when proper prevention measures are taken, it is estimated that 3 percent of orthopedic surgical patients will develop DVT, and 1.5 percent will develop PE. DVT and PE remain the most common cause for emergency re-admission and death following joint replacement surgeries. In one survey conducted the patients surveyed after a THA or TKA stated problems with their prophylaxis varied widely: 83 percent reported issues with lack of ambulation, 74 percent used compression stockings, 57 percent used mechanical compression, 58 percent used an anticoagulant pill, 46 percent used an anticoagulant injection, and 42 percent used aspirin. (https://www.stoptheclot.org/about-clots/toolkit-for-knee-hip-replacement-patients/orthopedic-surgery-fact-sheet/). Thus a need exists for a prophylaxis which is easy for the patient to use at home or work (outside a hospital setting or with the aid of a medically trained professional as noted above) which is ambulatory so that the patient can walk and return to life activities.

Knee replacements may also result in DVT as a post-operative complication. After knee surgery, most DVTs occur in the calf. Although less likely to lead to a PE, these clots are more difficult to detect. Less than one third of patients with DVT present with the classic signs of calf discomfort, edema, distended veins, or foot pain. It has been noted that the risk of developing DVT extends for at least three months after a total knee replacement. The risk is greatest two to five days after surgery; and a second peak development period occurs about 10 days after surgery. Currently, it has been noted that patients at home are experiencing an increase in DVT due to lack of activity and movement. While the patient is in the hospital, he or she may be connected to an electrical powered pump in combination with a therapeutic compression apparatus, however, once discharged, the current products are limited as noted herein, whereby most therapeutic compression apparatus are manual pumped so the patient can walk, work, etc. and those that are electric powered typically require being tethered to an electric outlet or the electric pump is integral to the therapeutic compression apparatus and not practical to walk about in life. Thus a need exists for a system which can be used to prevent, reduce or even treat DVT which is practical to use, mobile and easy to be administered by the patient post-operative total knee replacement of any other knee, hip or leg surgery. A need exists so that the user can walk around with the compression profile maintained while not being limited to an electrical plug or some other separate source of continued, maintained or even increased then decreased compression, A need exists for an integrated valve or other means in the compression garment, wrap, device or apparatus to maintain the set compression.

Further compression treatments have been discussed in "Effect of High-pressure, Intermittent Pneumatic Compression for the Treatment of Peripheral Arterial Disease and Critical Limb Ischemia in Patients Without a Surgical Option", by Oscar M. Alvarez, Martine E. Wendelken, Lee Markoqitz and Christopher Comfort (Wounds, Vol. 27, Issue 11, pages 293-301, November 2015) wherein thirty-six patients with symptomatic peripheral arterial disease (PAD) or critical limb ischmeia (CLI) who were experiencing claudication pain, chronic resting pain, numbness, and ischemic lower leg/foot ulceration were randomized into 2 treatment groups. Eighteen of these patients received treatment with high-pressure, intermittent pneumatic compression (HPIPC) 60 minutes twice daily for 16 weeks, and 16 subjects received standard care consisting of an exercise regimen of walking for 20 minutes twice daily for 16 weeks. The HPIPC device delivers bilateral pressures of 120 mm Hg. Cycle times provide sequential compression for 4 seconds (+/−0.5 seconds) followed by a 16-second rest period (+/−3.0 seconds), resulting in a 20-second cycle or 3 cycles per minute. The study was designed to measure patient-centered outcomes. The primary endpoint was peak walking time (PWT), defined as time to maximally tolerated claudication pain. The conclusion at the end of the study was that therapy consisting of HPIPC for 2 hours daily for a period of 16 weeks significantly improved PWT, reduced resting pain, and improved healing rates, physical function, and bodily pain. There were no device related complications, allowing for long-term use. A further conclusion was that HPIPC offers an excellent alternative for the palliative care of patients with PAD and CLI symptoms. Thus a need exists for a system which can be easily administered by a patient in the home setting which includes HPIPC.

Co-owned U.S. Publication No. 2004/0193084, which is hereby incorporated by reference herein in its entirety, discloses a device for applying pressure to the human leg for use in conjunction with treatment of varicose veins. The device includes a flexible member and at least one air bladder chamber integral thereto that are adapted to securely wrap around the human leg. A tube in fluid communication with the air bladder chamber(s) extends to an air pumping mechanism that operates to inflate the air bladder chamber (s) to a pressurized state. The flexible member preferably includes an opening at the knee joint level to enable a patella to protrude therethrough. In addition, the flexible member preferably extends below knee joint level and is adapted to securely wrap around a lower portion of a leg to provide stability to the leg. Preferably, the air bladder chamber of the device is substantially longer in a first dimension than in a second dimension orthogonal thereto such that the air bladder chamber can be positioned to cover a portion of the human leg that is relatively long in the vertical dimension and narrow in the horizontal dimension.

Co-owned U.S. Pat. No. 7,276,037, which is hereby incorporated by reference herein in its entirety, discloses an apparatus for applying compression therapy to an extremity of the human body, such as a portion of the human leg. The device includes a flexible member and an air bladder chamber. The flexible member is adapted to wrap around the extremity to secure the air bladder chamber to the extremity. An air pumping mechanism is operated to inflate the air bladder chamber to a pressurized state. One or more fluid-filled pressurized members are provided, each separate and distinct from the flexible member and the air bladder chamber and thus readily moveable relative to the flexible member and the air bladder chamber. The pressurized member(s) is operably disposed between the extremity and the flexible member whereby it applies increased localized pressure to the extremity during use. Preferably, the air bladder chamber is substantially longer in a first dimension than in a second dimension orthogonal thereto such that it can extend longitudinally along the extremity to cover a relatively long and narrow portion of the extremity. The position of the air chamber can be readily adapted to apply local pressure to desired body parts (such as a certain venous channel). The pressurized member(s) can be positioned during use such that it covers a venous ulcer (or other treatment sites) and applies increased localized pressure to the treatment site in order to promote healing.

Surgical treatments for leg vascular issues include Sclerotherapy which is a medical procedure used to eliminate varicose veins and spider veins. Sclerotherapy typically involves an injection of a solution (generally a salt solution) directly into the vein. The solution irritates the lining of the blood vessel, causing it to collapse and stick together and the blood to clot. Post-operative procedures may require compression bandaging or stockings, both of which have the problems described above in regard to slippage down the thigh to the knee as well as cost and need for a skilled level of knowledges in order to properly bandage the sclerotherapy treatment area.

Certain compression devices are known which may include an inflation means capable of providing constant static pressure for a period of time as well as providing intermittent varying pressure for a prior of time, but the currently known devices are bulky as the inflation means or pump is an integral part of the wrap mechanism. Such known compression devices are limiting as the patient cannot walk or function in work, school or otherwise wearing a bulky leg, foot, thigh or other limb wrap. Further, certain known compression devices only allow for varying intermittent pressure if directly connected to an electrical power source, thereby further limiting the use by the patient as he or she is literally tethered to a wall outlet. Moreover, known compression devices or apparatus lack a check valve to prevent both over-inflation and to also seal and prevent deflation while the user engages in activities or rests in place. A need exists for a therapeutic compression system including a compression apparatus having an integrated valve to maintain the level of compression and prevent deflation of a bladder, and preferably a self-sealing valve.

A need exists for a system in which a compression gannent includes a universal connector to a variety of pumps. Thus, the user could interchange between an intermittent pneumatic pressure pump, for instance when seated, and then change to a set pressure pump for instance when walking. The user could connect to a hand pump, an electrical pump, a mechanical pump and any other type of conventional or inventive pumps without any additional converted needed. The various type of pumps are not limited to the two listed above but could be any type of pump with a universal connector.

Further a need exists for a system including an inflation means which can inflate multiple therapeutic compression apparatuses at the same time. Another need exists for a system including an inflation means which means can switch between a constant static pressure level and an intermittent varying pressure level. The inflation means is also configured to provide constant static pressure for a period of time as well as varying intermittent pressure for a period of time and to alternate between such pressure settings.

A further need exists for a system including an inflation means which is less bulky than known systems. The user can thus return to life activities sooner than with known compression systems, prophylaxis systems and other treatment systems which limit the user's ambulation both within and outside the home due to power constraints (electrical, mechanical, battery, manual, etc.) on the system, An additional need exists for a system including one or more sensors to measure the user's limb in regard to pressure on the skin, motion of the limb, blood pressure, tanometer sensor, GPS sensor, and the like while the system is in use. Such sensors may be connected to the inflation means so as to regulate the pressure from the inflation means and either increase or decrease the current pressure level(s). Such sensors may also be connected to a database and possibly accessible to a medical professional and/or the user in real time or as saved over time.

A need exists for a system of multiple of compression garments have separate active pressures. For instance, a thigh compression garment could be used in conjunction with a lower leg compression apparatus such as that described (and incorporated herein as reference) in U.S. Pat. Nos. 9,033,906 and 7,967,766 and 7,559,908 and U.S. Ser. No. 13/444,600 and U.S. Ser. No. 16/328,718 and therefore the user could wear two separate therapeutic compression apparatus on the entire leg and could also include an optional knee wrap. In this instance the user could have one pressure level on the inventive thigh therapeutic compression apparatus whereas a calf compression garment could have a second pressure level and both compression garments are connected to one pneumatic pump configured to have multiple pressure outlets. Such a need exists for such a system.

In regard to thigh compression garments, such known compression garments for the user's thigh have a tendency to slip down the user's leg so that the garment either bunches at the knee or falls down the thigh towards the knee and rests above the knee rather than midway on the thigh. The location of the thigh compression garment should remain in place and any movement due to gravity as the user walks can affect the efficacy of the treatment for CVI, DVT and/or lymphedema, as well as other treatments. The thigh region may be the area of a user's leg between the hip and knee. The basic anatomy of the leg may cause the slippage in that part to the shape of leg anatomy conical in nature and facilitates slippage in a downward direction of the leg.

Users have attempted to reduce slippage of a thigh wrap downward toward the knee by tightening the wrap as much as possible, but this can result in cutting off circulation and other complications. Some users have added adhesive tape to adhere the thigh wrap (whether it is a bandage or compression garment) to the user's skin, but this also can result in complications. Thus, a need exists for a thigh compression garment with reduced slippage down to the knee. A need exists for a thigh compression garment with reduced slippage due to gravity.

All current known treatment apparatus, devices, bandages, stockings and hosiery have the problems of stability (no slippage), maintaining sufficient effective pressure without overpressure complications, maintaining compression and the like. Further all known apparatus, devices, bandages, stockings and hosiery, though especially the current treatment apparatus and devices, are only capable of connecting to one source of compression or inflation means and no universal inflation port of connector is known—wherein a patient could vary treatment through varying the inflation source and inflation means for the treatment apparatus or device. Further the known inflation means are extremely bulky and impractical for daily use in life.

Other known problems with the current treatment apparatus and devices, bandages, stockings and hosiery is the requirement that a skilled care-giver apply the current treatment apparatus and devices, bandages, stockings and hosiery. Such a skilled care-giver may not be available to all patients, notably those without long-term care insurance or provided a skilled home-health aid. Yet another known problem is leakage of set compression within the treatment apparatus and devices, bandages, stockings and hosiery resulting in an ineffective treatment and ineffective apparatus or device and the like which may be rendered useless to the patient and user. A further problem with the current treatment apparatus and devices, bandages, stockings and hosiery is that the inflation means or source of compression is set up as either manual or mechanical or electrical and cannot be interchanged in that the inflation port or inflation means is not universal and interchangeable. Yet another problem with the current treatment apparatus and devices, bandages, stockings and hosiery is that the inflation means or source is either static or intermittent and again cannot be changed during the treatment with such apparatus or device. Yet another problem with the current treatment apparatus and devices, bandages, stockings and hosiery is that the apparatus and device, bandages, stocking and hosiery slips down the leg due to gravity and/or walking or movement of the user.

The apparatuses, methods, assemblies and systems of the subject invention provide benefits and advantages that may overcome a number of problems with respect to known compression technologies, particularly the problems that arise due to the difficulty of applying current compression wrap technologies. The subject invention provides an alternative to known technologies that employ tight-fitting therapeutic elastic garments, which cause patients discomfort and are bulky and impractical to wear in daily life, and lose their elasticity as well as have slippage down the leg, and therefore their effectiveness over time. Those skilled in the art will readily appreciate that it would be beneficial to provide a therapeutic compression device and system for treating CVI, DVT and lymphedema that is adapted and configured to apply localized compression to the leg, thigh, calf and/or foot to prevent swelling and further improve venous circulation, that may also be self-administered by a patient effectively.

Without limitation, the inventive therapeutic compression system may be used with any required compression therapy, such as venous disease, vascular disease, lymphedema, post-operative (such as but not limited to TKR, KRA, HRA, THR and sclerotherapy, etc.) and the like. The inventive therapeutic compression system may be used to treat any general swelling as well as being used post operatively for example including in cases of sclerotherapy or vein ablation. The inventive therapeutic compression system may be used by a person for compression therapy such as athletes and lactic acid build up, or pregnant women, as well as any individual who walks a lot or is on their feet at work for period of time. Other uses for the inventive system may be envisioned.

The inventive therapeutic compression system also includes a check valve on the wrap which may be self-sealing so as to prevent the fluid from escaping and the bladder deflating. Known compression apparatus do not have a check valve or other way to seal the bladder to prevent deflation. The inventive therapeutic compression system check valve assists with the ambulatory aspect of the inventive system by allowing the user to walk, run, work and go out with one or more compression apparatus on the user and while engaging in activities the inflation level or gradient compression profile does not go down or deflate. Other uses for the inventive thigh therapeutic compression apparatus may be envisioned.

SUMMARY OF THE INVENTION

The subject invention is directed to a therapeutic compression system and methods of use. The therapeutic compression system includes a therapeutic compression apparatus and an inflation means wherein the inflation means is less bulky than known inflation means. The inflation means includes at least two settings, a setting of constant inflation or pressure and a setting of varying or intermittent inflation or pressure. The inventive therapeutic compression system may include at least one sensor, such as a motion sensor, pressure sensor, blood pressure sensor, tanometer sensor, or other sensors to monitor use of the inventive system by the patient and/or medical professionals.

The system includes different therapeutic compression apparatus such as but not limited to an apparatus for use on a limb, leg, calf, thigh, hip, pelvis, knee, foot, torso, arm, neck or other body parts.

The therapeutic compression system includes a therapeutic compression apparatus which such apparatus may further comprise at least one bladder operatively associated with the therapeutic compression apparatus for applying pressure to a treatment site on the limb such as a leg. The therapeutic compression apparatus includes a connecting means such as a loop and hook material in order to wrap the therapeutic compression apparatus around the limb, such as a leg, of the user. Alternatively, the at least one bladder may be integral with the connecting means or wrap. One or more connecting means may be operatively associated alone the first and second peripheral edges of the therapeutic compression apparatus for securing it around the limb.

The at least one bladder may be adapted and configured to form a predetermined gradient compression profile and/or gradient pressure profile when the at least one bladder is filled. The gradient compression profile and/or gradient pressure profile may be determined by the location of various spot welds on the bladder to create the gradient compression profile and/or gradient pressure profile. The gradient compression profile and/or gradient pressure profile instead may be determined by the inflation means connected or integral to the therapeutic compression apparatus. In another embodiment, the gradient compression profile and/or gradient pressure profile may be determined by pressure being created in one direction within the bladder by the inflation means and then exiting the bladder through an exhaust port or other exit means. The at least one bladder may be one of a wedge-shaped bladder, a cone-shaped bladder, a disk-shaped bladder or a rectangular-shaped bladder. The at least one bladder may also include a plurality of fluid chambers. The therapeutic compression apparatus, as part of the inventive system, may further comprise at least one means for adjusting pressure coupled to the at least one bladder for controlling an amount of pressure supplied to the treatment site.

The subject invention is also directed to a bladder assembly for a compression apparatus for providing pressure to a limb. The bladder assembly comprises: at least one bladder having first and second flexible walls secured to one another about a peripheral edge thereof to form an air pocket; and at least one spot weld provided in a predetermined location inward of the peripheral edge connecting the first and second walls to one another to define a plurality of chambers within the bladder. The geometric placement of the at least one spot weld determines a compression profile and/or pressure profile of the at least one bladder in one embodiment. The pressure profile and/or compression profile may be a gradient pressure profile and/or a gradient compression profile.

An inflation means for inflating the bladder such as the air pocket through at least one inflation port may be provided in the first wall of the bladder assembly. The inflation means may be detachable from the at least one inflation port. At least one pressure valve may be operatively associated with the inflation means for controlling an amount of pressure within the bladder and the air pocket within the bladder. The inflation port includes a check vale so as to maintain a given pressure within the bladder of the therapeutic compression apparatus. The inflation port may be universal in that it is configured to be capable of connecting to and accepting a plurality of inflation sources and inflation means such as a manual pump, mechanical pump, electrical pump, battery-operated pump, static pump, intermittent pump, pneumatic pump, negative pressure source and other variations.

The bladder is connected to an inflation port including a valve configured so that when the valve is in the closed position the pressure profile and/or compression profile is maintained at the then current pressure and/or compression level. The valve is configured so that when it is in the open position the fluid, such as air, flows from the inflation means into the bladder and if not connected to an inflation means then the fluid escapes from the bladder and it is deflated. The valve may be self-sealing or it may be connected to a means to open and close it with for example a level, knob, screw or other opening and closing means.

A method of the invention includes the therapeutic compression system including a therapeutic treatment apparatus used to treat CVI, DVT and/or lymphedema by applying the primary and secondary wraps around a limb by a patient and inserting an inflation means into an inflation port and inflating the bladders within the primary and secondary wraps and maintaining a certain pressure to treat the CVI, DVT and/or lymphedema.

Another embodiment of the present invention includes an assembly according to the invention includes a pressure mechanism having a flexible member for attachments to a limb and an air chamber which may be pumped up into a desired pressurized state, a separate relatively small pre-filled air bladder, an absorbent foam, sponge or dressing coupled to the pre-filled air bladder, and a suction conduit coupled to a source of negative pressure (suction) and in fluid communication with the absorbent foam, sponge or dressing. In a preferred embodiment, the pre-filled air bladder, the absorbent foam, sponge or dressing and the suction conduit are formed together as a unit.

According to one aspect of the invention, the flexible member of the pressure mechanism is adapted to wrap around a leg or arm and over the pre-filled air bladder in order to secure the pre-filled air bladder and the foam, sponge or dressing to a wound or ulcer in the extremity. Thus, the flexible member is provided with some fixation structure such as a hook and loop closure mechanism. An air pumping mechanism is preferably coupled to the air chamber of the pressure mechanism in order to inflate the air chamber to a pressurized state. The air chamber of the pressure mechanism is preferably designed to apply pressure along a predefined area (e.g., the saphenous vein of a leg) as opposed to around an entire limb.

According to another aspect of the invention, the suction conduit is located either between the pre-filled air bladder and the absorbent foam, sponge or dressing which is adhered to the small air bladder, or the pre-filled air bladder is formed as a donut with a central opening and the suction conduit extends through the central opening. By coupling the suction conduit to a source of negative pressure, exudate from the wound or ulcer is sucked through the foam, sponge or dressing into the suction conduit.

One of the methods of the invention include locating the pre-filled air bladder and foam, sponge or dressing over a wound or ulcer on a limb, wrapping the flexible member of the pressure mechanism around a limb with the air chamber located over the pre-filled air bladder/absorbent foam, sponge or dressing, and fastening the pneumatic pressure mechanism in place with the fixation structure. When the apparatus is properly located and affixed to the limb, the air chamber is inflated, preferably to 30-40 mm Hg, thereby applying pressure to the limb and more specifically via the pre-filled air bladder to the wound. The suction apparatus is activated by turning on the source of negative pressure, and exudate from the wound or ulcer is pulled through the absorbent foam, sponge or dressing into the suction conduit.

Another embodiment of the present invention includes system including an apparatus for applying intermittent pressure to a portion of the human body, such as an area of the human leg, which assists with the healing and treatment of various conditions such as venous ulcers or wounds by promoting blood flow into and out of the area and by increasing drainage. The apparatus may include a thigh bladder or a foot bladder and a leg bladder, each having inflatable chambers that accommodate an entering fluid by inflating. The bladders are fluidly coupled by a fluid conduit, and each is preferably equipped with a means for locating it on a portion of the body. In a preferred embodiment, the thigh bladder is position between the pelvis or groin or hip area of the user and the knee of the user. As a person walks while wearing the apparatus, a portion of the thigh bladder deflates as the person's leg moves foot (heel) strikes the ground due to the external pressure placed on the foot bladder, thereby forcing fluid out of the foot bladder, through the fluid conduit, and into the leg bladder, which raises the pressure therein. As the person's foot rolls from heel to toe in the standard walking motion, the external pressure from the person's weight is removed from the foot bladder, resulting in the pressure of the leg bladder being higher than the pressure in the foot bladder. Fluid thus flows back through the fluid conduit and into the foot bladder, which then inflates again to its original state, such that the pressures of the foot bladder and leg bladder are equalized. This process repeats as a person walks, thereby creating a pumping or kneading force on the leg as the pressure in the leg bladder intermittently increases and decreases, thereby promoting blood flow, fluid drainage, treatment, and healing to various parts of the leg.

In another embodiment including a thigh therapeutic compression apparatus and an integral or separate lower leg therapeutic compression apparatus including a foot bladder, the foot bladder is positioned on a bottom of a foot and the leg bladder is positioned on a lower portion of a leg. As a person walks while wearing the apparatus, a portion of the foot bladder deflates as the person's foot (heel) strikes the ground due to the external pressure placed on the foot bladder, thereby forcing fluid out of the foot bladder, through the fluid conduit, and into the leg bladder, which raises the pressure therein. As the person's foot rolls from heel to toe in the standard walking motion, the external pressure from the person's weight is removed from the foot bladder, resulting in the pressure of the leg bladder being higher than the pressure in the foot bladder. Fluid thus flows back through the fluid conduit and into the foot bladder, which then inflates again to its original state, such that the pressures of the foot bladder and leg bladder are equalized. This process repeats as a person walks, thereby creating a pumping or kneading force on the leg as the pressure in the leg bladder intermittently increases and decreases, thereby promoting blood flow, fluid drainage, treatment, and healing to various parts of the leg.

In one embodiment of the present invention, the therapeutic compression system includes an inflation means connected to a belt so the user can wear it around his or her waist in daily use, such inflation means may be connected to the therapeutic compression apparatus by, for example, a hose or a tube, which provides inflation to the bladder within the therapeutic compression apparatus and/or wrap.

In another embodiment of the present invention, the therapeutic compression system includes an inflation means which can switch between constant static pressure levels (different pressure levels such as 20 mm-Hg, 30 mm-Hg, 40 mm-Hg, up to 200 mm-Hg, etc.) and intermittent varying pressure levels, whereby the pressure is applied to the therapeutic compression apparatus via a hose or tube.

In other embodiments the inflation means is connected to two or more tubes and thereby connected to two or more bladders, whether multiple bladder within one therapeutic compression apparatus or a single bladder within multiple therapeutic compression apparatuses, or a combination thereof.

In another embodiment the system includes one or more sensors to monitor movement of the therapeutic compression apparatus, pressure levels, blood pressure of the patient, tonometry of the target limb, or other sensor data.

These and other aspects of the contacts of the subject invention will become more readily apparent from the following description taken in conjunction with the drawings.

BRIEF DESCRIPTION OF THE DRAWINGS

So that those having ordinary skill in the art to which the subject invention pertains will more readily understand how to make and use the apparatuses of the subject invention, preferred embodiments thereof will be described in detail herein below with reference to the drawings, wherein.

DETAILED DESCRIPTION OF THE PREFERRED EMBODIMENTS

Figure 1:
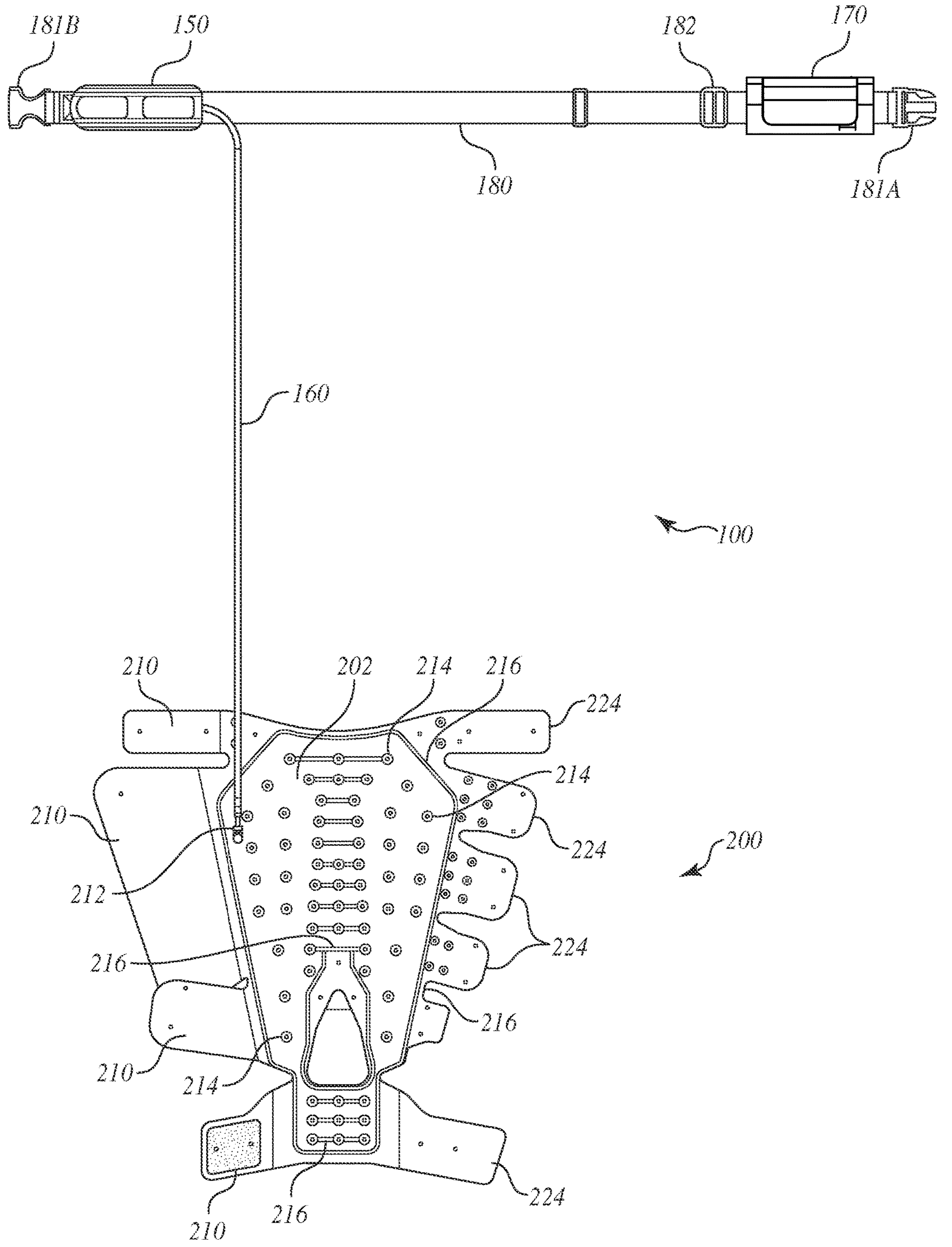
FIG. 1 is a view of one embodiment of the present invention including a lower leg therapeutic compression apparatus connected to a tube connected to an inflation means located on a retaining means such as a belt.

Preferred embodiments of the subject invention are described below with reference to the accompanying drawings, in which like reference numerals represent the same or similar elements. One of ordinary skill in the art would appreciate that while the apparatuses discussed herein relate to compression therapy of the leg and foot, the scope of the invention is not limited to those exemplary applications and may be sized and shaped for the anatomical portion for which compression therapy is needed.

The subject invention provides compression to a patient's limbs, including the extremities, including for example, the leg of a user and more specifically the thigh of a user, in a manner that is simpler, less bulky, more practical, more mobile, and more convenient than current systems. Any limb or body part may be compressed by the instant system including a therapeutic compression apparatus such as for instance a foot, calf, thigh, knee, leg, hip, buttocks, waist, torso, ribs, shoulder, arm, hand, fingers, neck, head or the like.

The subject invention provides system for providing compression and preventing swelling of a limb such as for instance the leg using a non-elastic binder and bladder which can be used for compression, which apparatus is connected to an inflation means including a duel means having both constant static pressure levels and varying intermittent pressure levels. The system is provided in in a manner that allows for consistent measuring of the pressure supplied, as well as safe, comfortable, more practical, more mobile, convenient, effective, and self-application by the patient.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" would include a plurality of such stimuli and reference to "the signal" would include reference to one or more signals and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

Referring now to FIG. 1, there is illustrated an exemplary embodiment of the inventive system 100 including a therapeutic compression apparatus 200, an inflation means 150 and a connecting means 160. In some embodiments the inflation means 150 is connected to a retaining means 180 such as a belt. In some embodiments the therapeutic compression apparatus is a lower leg compression apparatus such as the Aero-Wrap™ by Sun Scientific, Inc. and disclosed in U.S. Pat. Nos. 9,033,906 and 7,967,766 and 7,559,908 and U.S. Ser. No. 13/444,600 and U.S. Ser. No. 16/328,718 which are all incorporated herein. In some embodiments the inflation means may be a manual hand pump, foot pump, mechanical pump, electrical pump, battery-operated pump, static pump, intermittent pump, varying pump, automatic pump, pneumatic pump, negative pressure pump, suction pump or vacuum, pulsing pump, or any combination thereof or any other known or developed source of inflation so as to provide a certain pressure within the therapeutic compression apparatus so to provide compression in use by the patient. In some embodiments the inflation means is connected to the therapeutic compression apparatus by a hose or tube. In some embodiments of the inflation means is connected to a retaining means such as a belt or wrap to be worn by the user.

Figure 2:
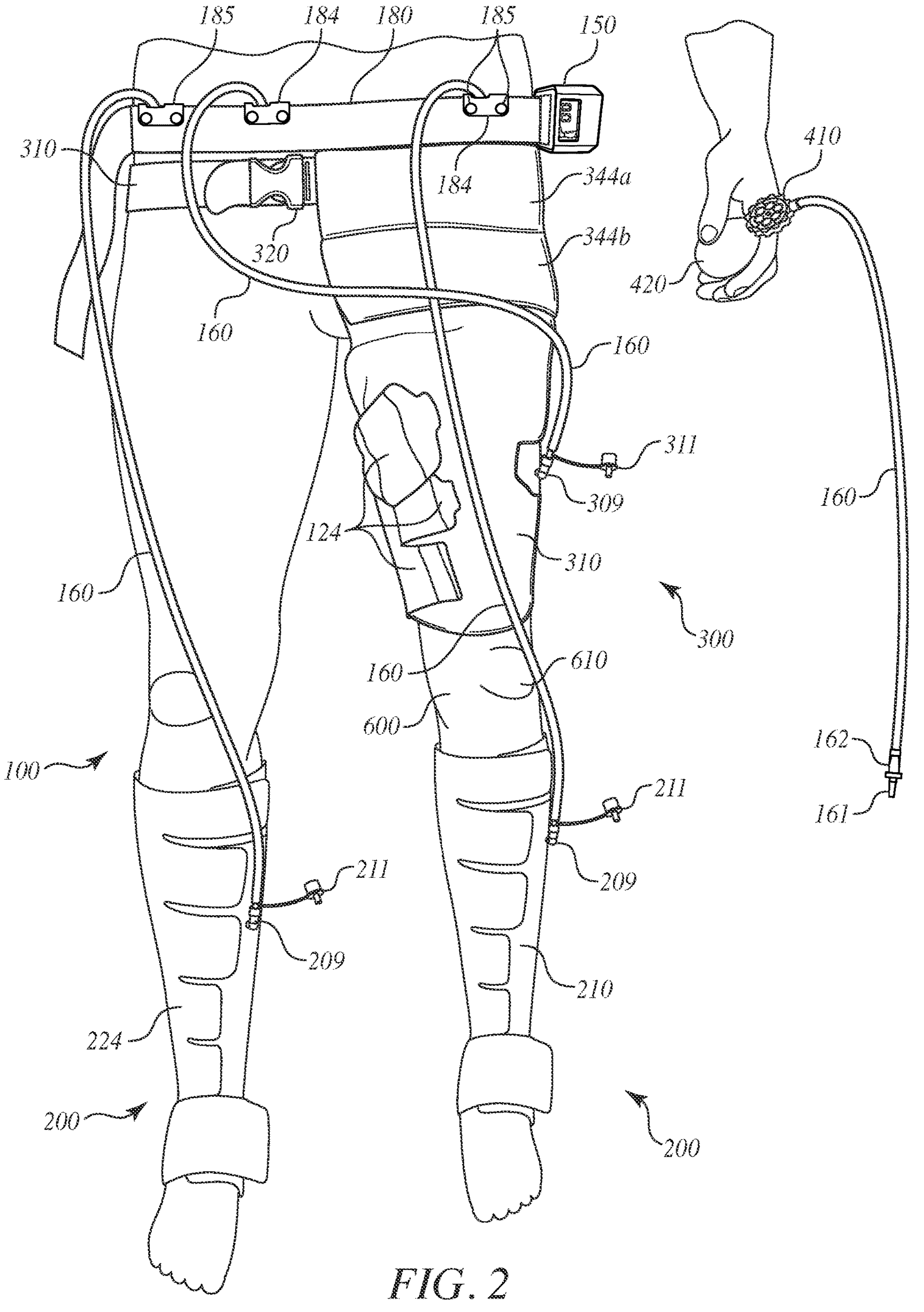
FIG. 2 is another embodiment of the present invention in use on a person including two lower leg therapeutic compression apparatuses each connected to a tube and a thigh therapeutic compression apparatus, all three tubes connected to one inflation means located on a retaining means such as a belt.

The therapeutic compression apparatus 200, 300 may be comprised of a bladder 202 such as a compression bladder either integrally formed in the therapeutic compression apparatus 200, 300 or the therapeutic compression apparatus 20, 3000 is configured for the bladder to be inserted (not shown) within the therapeutic compression apparatus 200, 300. The therapeutic compression apparatus 200, 300 is configured and adapted to wrap around a patient's limb such as in for instance a leg, calf, knee, foot, ankle, thigh, torso, arm, neck or any other limbs. The therapeutic compression apparatus 200, 300 is not limited to the limbs or body parts listed above but could be any body part such as without limitation a foot, ankle, calf, lower leg, knee, thigh, groin, hip, leg, buttocks, torso, stomach, chest, shoulder, arm, elbow, hand, wrist, neck, head or the like and any combinations thereof. As shown in FIG. 1 the therapeutic compression apparatus 200, 300 is a lower leg compression apparatus 200 and as shown in FIG. 2 also includes a thigh therapeutic compression apparatus 300. The therapeutic compression apparatus 200 as shown in FIGS. 1 and 2 is a wrap member with a proximal end portion (top as oriented in FIGS. 1-2 closer to the knee of the user) and opposed distal end portion (bottom as oriented in FIGS. 1-2 wrapped around the foot of the user) which is configured and adapted to conform around a patient's lower leg including the foot and calf and provide compression through the inflation of bladder. In this embodiment the therapeutic compression apparatus 200 includes an inner sheet and outer sheet which are made out of a nylon laminated polyurethane sheet which are configured and adapted to be RF welded together. However, any other suitable materials which are weldable or otherwise joined while being airtight can be used. Continuous peripheral weld lines 216 form an airtight boundary of integrally formed bladder 202. In this exemplary embodiment, bladder 202 is a single continuous bladder throughout however, it is envisioned that the therapeutic compression apparatus 200 could have an independent bladder either separately inflatable or inflatable through a one-way valve or other desired inflation/deflation configuration.

In this embodiment, hook and loop fasteners 224 are provided along the edge of inner and outer sheets in order to ease adjustment and secure lower leg therapeutic compression apparatus 200 on a patient's limb such as for example a calf or foot. It is envisioned that the thigh therapeutic compression apparatus 300 can includes hook and loop fasteners 324 but also could be secured to a patient's thigh by other means, such as zippered, buttoned, or be cuff shaped by other such suitable means. Further, it is also envisioned that hook and loop closures 224, 324 can be replaced by material similar to that of an ankle strap, knee strap, hip strap or any other type of strap (including those described below) and be welded/sewn/attached to bladder for improved comfort.

Referring now to FIGS. 1-2, in this embodiment the therapeutic compression apparatus 200 has a bladder integral within inner sheet and outer sheet, with the location and desired preconfigured compression gradient profile obtained cost-effectively. A number of different embodiments of bladder configurations can be used in the therapeutic compression apparatus 200 such as those configurations described above. FIGS. 1-2 show therapeutic compression apparatus 200 having bladder with a plurality of spot welds 214 therein. Spot welds 214 are strategically placed within bladder 202 in a predetermined pattern based on the desired gradient profile relative to the compression needed at the patient's treatment site. Spot welds 214 enable bladder 202 to define the gradient compression profile when inflated through inflation port 212. The geometric placement of spot welds 214 within bladder 202 allows increased inflation of certain portions of bladder 202, and can create one or more fluid chambers within bladder 202. This configuration is particularly useful when compression is needed to improve fluid movement (e.g., blood, lymph, etc.) within the body. Further, linear weld lines 216 allow for better compression along the calf of a patient's leg by increasing tension applied as well as the sole of the foot area of a patient. This increased tension can generate a more effective compression in order to increase venous flow. Linear weld lines 216 located laterally along calf create a ribbed portion, which keeps the inflated profile of therapeutic compression apparatus 200 compact which can further increase ambulation and reduce interference with a patient's clothes.

It can be appreciated that depending on the location of the therapeutic compression apparatus 200, different pressure gradients may be utilized. Other possible gradient pressure profiles may be imagined based upon the geometric location of the spot welds 214, alone or in connection with the linear welds 216. For example, in the thigh therapeutic compression apparatus 300, depending on the location of the limb to be compressed, such as the medial area of the thigh, the linear welds 316 and spot welds 314 may be in different geometric configurations than those shown in FIGS. 1-2. Again the gradient pressure profile and/or the gradient compression profile may be based on the geometric pattern of the spot welds 314 alone or in combination with linear welds 316. In another embodiment of the therapeutic compression apparatus, not shown, the gradient compression profile and/or gradient pressure profile may be based on the pressure level from the inflation means alone, or combined with the overall shape of the bladder 202, 302.

It can be appreciated that depending on the location of the therapeutic compression apparatus being placed on the patient's body part or limb, different pressure gradients may be utilized. Further, different pressure gradients may be employed depending on the treatment (general swelling, lactic acid build up, lymphedema, post-sclerotherapy, CVT, DVT, etc.) and the treatment site. Other examples of bladder pressure gradient profiles are described in U.S. patent application Ser. No. 12/911,563 and U.S. patent application Ser. No. 12/855,185, the disclosures of which are incorporated by reference in their entirety.

In this embodiment as shown in FIGS. 1-4B one of the inflation means is a device 150 which is a pneumatic pump capable of attaching to inflation port 212 to inflate bladder within the therapeutic compression apparatus 200. It can be appreciated that other mechanical or automatic inflation pump (not shown) can also be attached to inflation port 212 to inflate and deflate bladder 202 within the therapeutic compression apparatus 200 to provide pulsating pressure to a user's limb. For example, as shown in FIG. 2, the inflations means 150 is a pneumatic pump and a second inflation means 150 is a hand manual pump 400 including a bulb 420 for manually pumping of air fluid and a hand dial 410 including a check valve within. A number or variety of inflation means can be employed such as a manual pump, hand pump, foot pump, mechanical pump, electrical pump, battery-operated pump, static pump, intermittent pump, varying pump, automatic pump, pneumatic pump, negative pressure pump, suction pump or vacuum, pulsing pump, or any other known or developed source of inflation so as to provide a certain pressure within the bladder so to provide compression in use by the patient. A valve 290 is incorporated into therapeutic compression apparatus 200 in the inflation port 212 to allow a user to selectively deflate bladder 202 of the therapeutic compression apparatus 200. Further, a check valve (not shown) or relief valve (not shown) is incorporated with either inflation means 150 or bladder 202 to prevent over-inflation once a maximum pressure is detected. Examples of relief valves are described in U.S. Pat. Nos. 7,276,037 and 7,850,629, the disclosures of which are incorporated by reference in their entirety.

Referring now to FIGS. 1-2, once the therapeutic compression apparatus 200 is secured around a patient's lower leg, bladder 202 is inflated and not able to shift out of place, thus increasing comfort and reducing fitting issues on the patient. In order to increase the ease of ambulation by a patient and practicality and mobility of the patient, in this exemplary embodiment, the inflation means 150 is connected to a retaining means 180, for example a belt. Any retaining means 180 may be employed such as for instance, and not shown, a thigh, hip or waist strap can be used. If a strap is used, the strap may be pulled tight against a patient's leg and hip so as to reduce slippage of the therapeutic compression apparatus 200 and the inflation means 150.

In this embodiment, the retaining means 180 is a belt or strap and includes a belt snap 181A (male connector) and a belt clip 181B (female connector), which are joined together by the belt strap 181B being inserted within the belt clip 181A and then snapped together. Other embodiments not shown may include a garter belt system or a belt buckle or any other known closing or connecting means. Again, the retaining means 180 if a belt may be closed or connected though other connecting means such as for example and not limited to hook and loop closure or VELCRO™ or any other known connecting means such as buckles, straps, buttons, snaps, zippers, hooks and other combinations. As shown in FIGS. 1-4, the retaining means 180 belt is worn at the waist of the patient. In another exemplary embodiment, the retaining means 180 may be a hip strap (not shown) or a waist strap (not shown as what is shown is a belt embodiment) is configured and adapted to improve wearability of the inflation means 150 and increased ambulation for the patient.

It will be appreciated that the chambers of the bladder 202 may be filled by air, fluid or other known means of inflation, It will also be appreciated that the bladder 202 can be arranged to receive air and be inflated using a manual pumping bulb (as shown in FIG. 5), or can be inflated by an electric air pump (not shown) which can use batteries or AC wall current to pump air into the chamber(s). The inflation port 212 of the therapeutic compression apparatus 200 is universal in that it can connect to a multiple of different types of inflation means. Any known source of air or fluid may be employed whether manual, mechanical, electrical, battery-operated or any other power sourced pump or pressure creator. The inflation means 150 may be a manual pump, hand pump, foot pump, mechanical pump, electrical pump, battery-operated pump, static pump, intermittent pump, varying pump, automatic pump, pneumatic pump, negative pressure pump, suction pump or vacuum, pulsing pump, or any other known or developed source of inflation so as to provide a certain pressure within the bladder so to provide compression in use by the patient.

As shown in FIGS. 1-4, the inflation means 150 is connected to the therapeutic compression apparatus 200 via a tube 160 or hose. Any other known connecting means may be employed. The embodiments shown in FIG. 2 include a clear tube 160 connected to the hand held manual pump 400 and another embodiment of the tube 160 is shown with a covering 162 on the tube, shown as black cloth 162 in FIGS. 1-4 so as to allow the user to wear the covered tubes 160 more easier under clothing or less likely to be seen when worn over clothing. The tube 160 is connected to the therapeutic compression apparatus by inserting, for instance a male luer slip 161, into the inflation port 212, 312. At the opposite end of the tube 160, the tube 160 is inserted into the inflation means, as shown in FIG. 1-4, via the pump output port(s) 152.

The inflation means 150 shown in this embodiment in FIGS. 1-4 is a pneumatic pump which is rechargeable via an electric charger, though the pump could also be battery operated or any other known power source. The inflation means 150 in this embodiment includes a base 151 connected to the retaining means 180 belt. The base 151 is connected to the main pump assembly via a series of screws 154 and O-rings 153. The main pump assembly is shown as 156 though the inner mechanical and electrical portion is not shown. The inflation means 150 of this embodiment is an electric powered air pump with interface pressure of 50 mm-Hg (for example to prevent DVT or treat CVI). The pump 156 may apply pressure constantly in a static status or may apply pressure intermittently, for example by applying 50 mm-Hg, holding for 10 seconds, then releasing until next cycle of 30-45 seconds, and repeating for a period of time. Other embodiments could include pressure levels of 60 mm-Hg, 75 mm-Hg, 80 mm-Hg, 90 mm-Hg, 100 mm-Hg or other known pressure levels, depending on the treatment plan and the target limb of the patient. There could also be multiple pressure levels within the pump so there is varying pressure during treatment.

Figure 3:
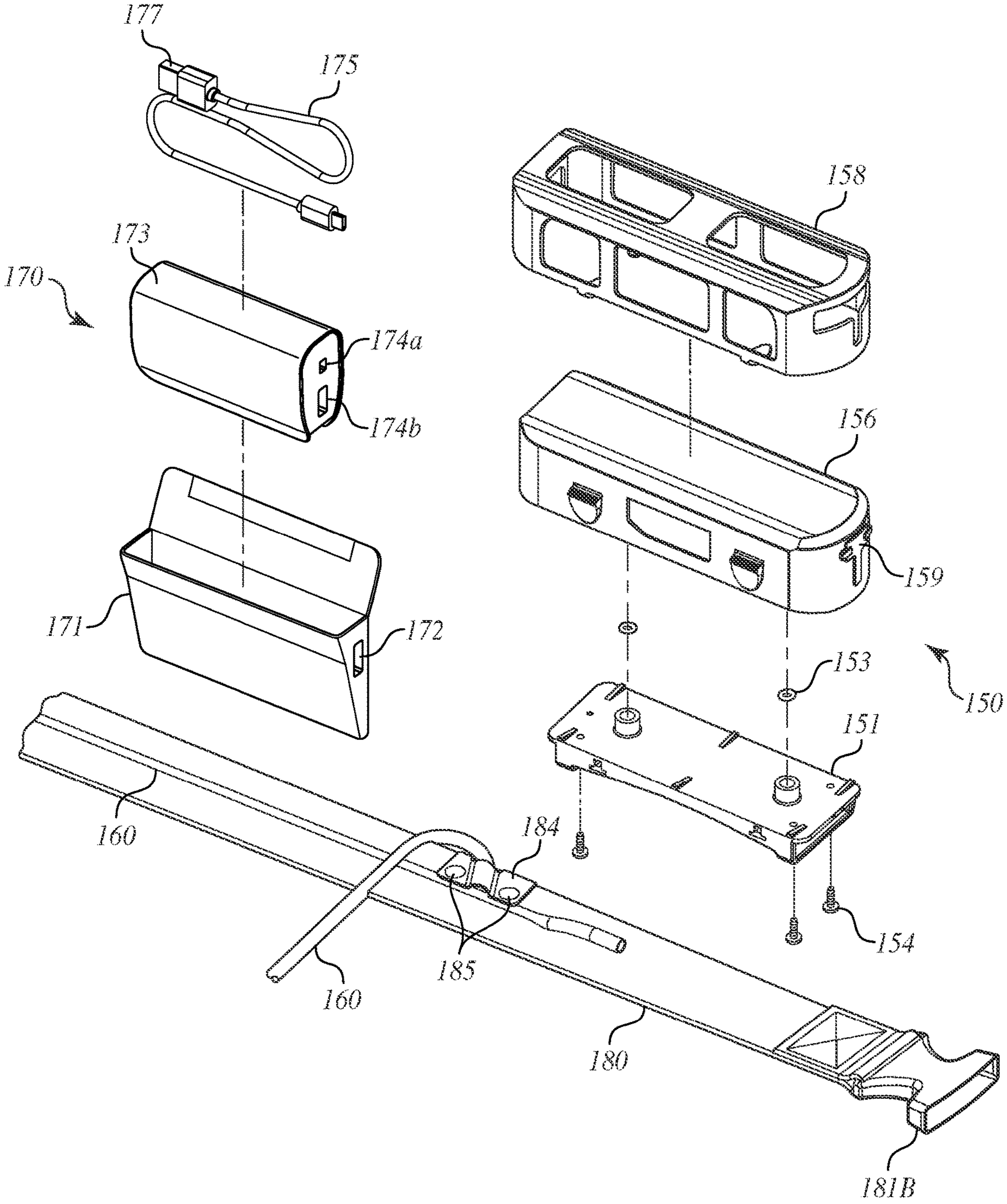
FIG. 3 is an exploded view of the embodiment of the belt, inflation means and battery pack as seen in FIGS. 1 and 2.
Figure 4A:
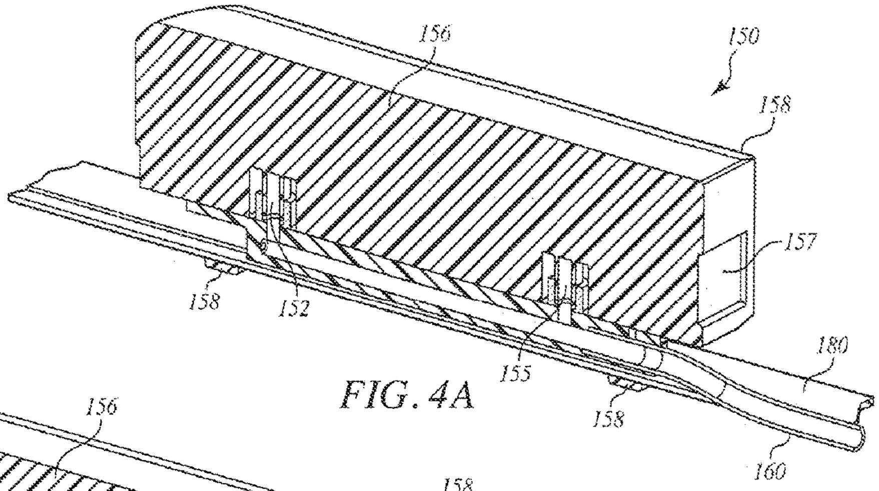
FIG. 4A is a cut away view of the inflation means of FIG. 1 showing the sensor port and one inflation port, both connected to one tube which inflates and deflates a therapeutic compression apparatus.

As shown in FIG. 3-4, the inflation means 150 main pump 156 includes a display 157 which in this embodiment shows remaining battery power level, the limb being compressed, and elapsed time of this instant session in hours and tenth of hour. The display 157 can be modified to show varying pressure levels, other limbs being compressed, time left for activation in a set time period, or the like. The USB port 159 and cover 158 are on the opposite side in this embodiment of main pump 156, for recharging of the pump battery (internal mechanisms not shown). An ON-OFF switch 165 is included in this embodiment though the ON-OFF switch in other embodiments may be digital and includes various selections such as pressure level, static or intermittent status, time to operate at each pressure level and/or status, limb to be compressed if the pump 156 is connected to multiple therapeutic compression apparatus 200, or the like.

An optional protective cover, shown in FIGS. 1-4, is a flexible cover 158 so to protect the inflation means 150 when dropped by the user or just common wear and tear on the pump mechanism or even to prevent over heating or chaffing at the waist of the user. The flexible cover 158 may be comprised of a polymer, rubber or other flexible materials or the like.

Once the therapeutic compression apparatus 200 is secured around a patient's limb such as for instance a leg, bladder 202 is not able to shift out of place, thus increasing comfort and reducing fitting issues on the patient. In order to increase the ease of ambulation by a patient, in an exemplary embodiment, the inflation means 150 is connected to the bladder 202 via the male luer slip 161, and the inflation means 150 is connected to a retaining means 180, which in this embodiment is a belt. The user can then activate the main pump 156 via the ON-OFF switch 165. The user then wears the inflation means 150 similar to a mobile phone on an individual's belt. In this embodiment, the retaining means 180 is a belt which is adjustable to the waist of the user via an adjusting means 182 such as for example only a triglide and/or end clip. The user thus has increased mobility compared to a therapeutic compression apparatus where the inflation means is integral to the apparatus.

Figure 4B:
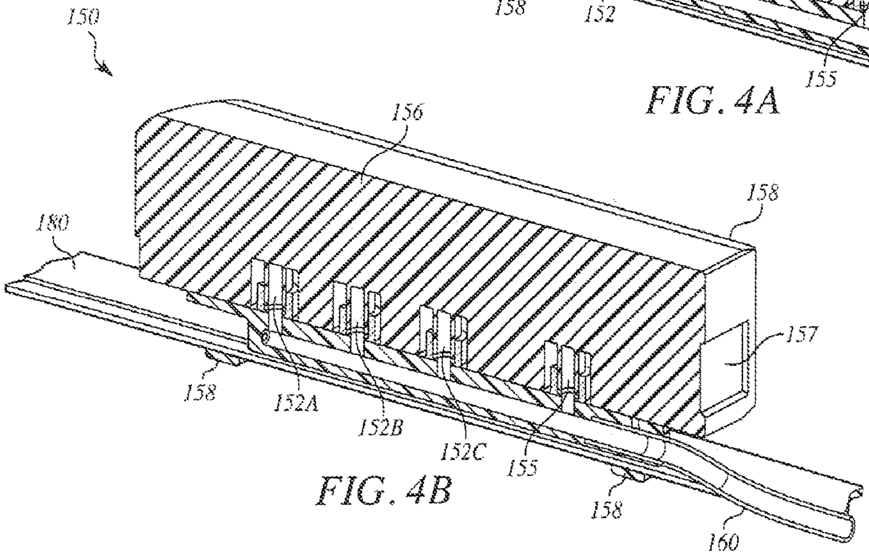
FIG. 4B is a cut away view of the inflation means of FIG. 2 showing the sensor port and three inflation ports, all connected to a tube which inflates and deflates all three therapeutic compression apparatus or three separate bladders within one or more therapeutic apparatus, or in the alternative could be connected to at least three tubes may be connected to three separate bladders within one therapeutic compression apparatus or the three tubes could in the alternate be connected to at least three separate therapeutic compression apparatus, or a combination thereof.

The inflation means or mechanism for each of the various embodiments of the present invention may include a hand pump, electric pump, battery-operated pump, remote controlled pump, air pump, gas pump, or any other known inflation means. A number or variety of inflation means can be employed such as a manual pump, hand pump, foot pump, mechanical pump, electrical pump, battery-operated pump, static pump, intermittent pump, varying pump, automatic pump, pneumatic pump, negative pressure pump, suction pump or vacuum, pulsing pump, or any other known or developed source of inflation so as to provide a certain pressure within the bladder so to provide compression in use by the patient. Further, the inflation means could include a means to monitor or regulate the inflation. The inflation means could include programming such that the bladder 202 is inflated and deflated to a set pressure at intervals or at set times throughout the day or night when the compression apparatus is in use worn on the patient. For instance, by way of example only, the inflation means could be set to 40 mm-Hg at 9 am and then set to deflate to 20 mm-Hg at 11 am and then set to inflate to 30 mm-Hg at 12 pm and so on throughout the day and night for each patient individually. In another embodiment of the present invention, if the therapeutic compression apparatus has two separate bladders (not shown but for instance bladders 202A and 202B) then there may be two separate inflation ports 112 (e.g. 212 A and 212B not shown) that are each connected to either the same or different inflation means, and the pressure levels of the first bladder 202A and the second bladder 202B could be the same or have different pressure levels. For instance, by way of example only, the inflation means could be set to 40 mm-Hg for the first bladder 202A and set to 20 mm-Hg for the second bladder 202B, or each could vary and the inflation means be set to inflate, deflate, inflate, etc. throughout the day as described above. As shown in FIGS. 2 and 4B, multiple therapeutic compression apparatus 200, 300 can be connected to one main pump 156 so that the pressure levels of each bladder 202, 302 within each of the separate therapeutic compression apparatus 200, 300 may be the same or different, by way of example only, a right calf therapeutic compression apparatus 200 could be set to 40 mm-Hg for the bladder 202 within the right calf therapeutic compression apparatus 200 and set to 20 mm-Hg for the bladder 202 within the left calf therapeutic compression apparatus 100, or each could vary and the inflation means be set to inflate, deflate, inflate, etc. throughout the day as described above. The main pump 156 could be connected to three or more separate bladders within one therapeutic compression apparatus 200 or could be connected to three or more separate therapeutic compression apparatuses 200, 300 as shown in FIGS. 2 and 4B, three separate therapeutic compression apparatuses are shown, though in this embodiment only two hoses 160 are connected to the inflation means 150 and thus the left lower leg therapeutic compression apparatus 100 would have to be inflated via a hand pump 400 or a second inflation means (not shown).

As an example, treatment options would include intermittent pneumatic compression (HPIPC) 60 minutes twice daily for 16 weeks. In this example, the inflation means would have a pressure level of 120 mm-HG and the bilateral pressures of 120 mm Hg in a cycle time to provide sequential compression for 4 seconds (+/−0.5 seconds) followed by a 16-second rest period (+/−3.0 seconds), resulting in a 20-second cycle or 3 cycles per minute. This treatment may help reduce vascular issues such as lymphedema, DVT, CVI and the like.

In another example, treatment options could include reducing DVT through applying pressure pre-operation, for instance for the knee surgery, TKR, KRA, hip surgery, THR, HRA, or the like, to the target limb for a period of days or weeks or months prior to the surgical date. Prior to surgery the patient would apply compression via the therapeutic compression apparatus and inflation means of the inventive system to reduce swelling of the target limb. During the actual operation and immediately after surgery while still in the hospital setting, the patient would use the same or a different therapeutic compression apparatus connected to an inflation means within the hospital such as an intermittent compression pump accessible through the wall of the patient room or wheeled into the room, which may be considered mechanical DVT prophylaxis. Once discharged from the hospital setting, the patient can retain the same therapeutic compression apparatus and use it at home by applying pressure via the inflation means 150 of an electrical pump configured to apply both constant static pressure and intermittent varying pressure based on the treatment plan. The method of use may reduce or prevent DVT, CVI and other vascular issues. The therapeutic compression apparatus has a universal inflation port configured so it can connect to a hand pump (400) and electric pump (156) and a hospital pump (not shown) and many other pumps. This method if use of the inventive system may reduce swelling pre-surgery and post-surgery and also reduce CVU, DVT and other post-surgical complications. As stated above, the patient is more mobile and ambulatory using the inventive system including the inflation means 150 attached to the retaining means 180 belt. This system is also less cumbersome than current post-operative compression systems which weigh many pounds on their own and other products on the market.

In another embodiment method of use of the inventive system the system us used both prior to, during and after a lower body surgery. Particularly with lower leg joint replacement (knee and hip) surgery, there is an increased risk of DVT along with the pre and post-op issues related to leg swelling. Due to the universal nature of the inflation port (or valve) on the therapeutic compression apparatus, it can be coupled with a hand pump, a battery-operated pump, or the existing electrical intermittent pneumatic compression DVT systems that exist on the market. However, the sleeves to these existing DVT systems are not worn to reduce swelling, cannot apply compression in of a static nature, and cannot be used for mechanical DVT prophylaxis without the IPC DVT control unit. Thus, another method of use to improve the outcomes includes the steps of (a) at least 3 days pre-surgery, the patient is given the therapeutic compression apparatus 200 to reduce limb volume and leg swelling, which can be achieved with either static or intermittent compression pressure levels, then (b) during surgery and immediately post-operative the therapeutic compression apparatus 200 is connected to the IPC DVT control unit in the hospital or clinic or outpatient office setting, and the IPC cycles intermittently to provide standard DVT mechanical prophylaxis, and thereafter (c) as the patient is discharged, the patient is given the therapeutic compression apparatus 200 to bring home along with either or both the hand compression pump or battery operated (or electrical powered) inflation means 150, such as pump 156, to manage the risk of DVT along with preventing further swelling.

It is envisioned, that the inventive system 100 could be used in conjunction with a lower leg compression apparatus (such as those described in U.S. Pat. Nos. 9,033,906 and 7,967,766 and 7,559,908 and 7,276,037 and U.S. Ser. No. 13/444,600), and one inflation means could be connected to each of the two compression apparatus as shown in FIGS. 1-2. The inflation means could include programming such that the bladders of both the therapeutic compression apparatus 200 and the bladder 202 or bladders 202A, 202B of the lower leg compression apparatus 200 are each (or together at the same time) inflated and deflated to a set pressure at intervals or at set times throughout the day or night when the compression apparatus is in use worn on the patient. For instance, by way of example only, the inflation means 150 could be set to 40 mm-Hg at 9 am and then set to deflate to 20 mm-Hg at 11 am and then set to inflate to 30 mm-Hg at 12 pm and so on throughout the day and night for each patient individually. In another embodiment of the present invention, for instance, by way of example only, the inflation means could be set to 40 mm-Hg for a thigh bladder (not shown) and set to 20 mm-Hg for the lower leg bladder 202 (or calf bladder or foot bladder, etc.), or each could vary and the inflation means be set to inflate, deflate, inflate, etc. throughout the day as described above. Depending on the treatment plan for the patient and depending on the specific patient, each of the bladders could be set to the same or different pressure levels though out the day and night.

In one embodiment of the invention, the inflation means includes a manual pump (as shown in FIGS. 2 and 8) and the dial includes graphics of pressure amount such as "35, "45', "55' and "65" or lettering such as "A", "B", "C", "D" which each would correspond to a certain pressure such as 25 mm-Hg, 35 mm-Hg, 45 mm-Hg and 55 mm-Hg. The specific pre-determined pressure to correspond with the graphic is endless and not limited by the examples herein.

Further, the therapeutic compression apparatus may be deflated by a button or a switch to deflate the bladder 202 and thus release the pressure and/or compression profile. In another embodiment (not shown), the switch may have a plurality of integrated umbrella valves so that one umbrella valve is set and closed to maintain the pressure within the bladder 202, while a second umbrella valve would release a certain amount of air or fluid within the bladder 202, so as to release the pressure such as while the patient is walking (pressure increases on the thigh with each step or on the foot portion of a lower leg therapeutic compression apparatus) or flying (pressure increases based on altitude), and a third umbrella valve which would release all the air or fluid in the bladder 202, thus release all pressure and deflate the therapeutic compression apparatus 200). For instance by way of example only, the first umbrella valve is set in a closed position so that when activated this umbrella valve maintains the amount of air or fluid in the bladder 202 and thus maintains the set pressure, say for instance at 45 mm-Hg, the second umbrella valve is set to release the air or fluid within the bladder 202 if the pressure within exceeds 45 mm-Hg and bring the pressure down to 45 mm-Hg (such as when in high altitude or other increases in pressure) and then maintain the pressure at 45 mm-Hg, and a third umbrella valve is set to open and release all the air or fluid within the bladder 202 and thus release all pressure when activated by the patient so as to deflate the bladder 202 and the therapeutic compression apparatus 200. By way of another example, the dial or display 157 may include graphics such as (A) "Walk" wherein the set pressure amount is maintained while the patient walks and the pressure spikes and returns over and over in time as the umbrella valve remains in the closed position, (B) then a graphic of "Air" wherein the set pressure amount will be maintained by this umbrella vale occasionally releasing pressure as the pressure increases over the set amount or value so that the umbrella valve is activated to release air or fluid within the bladder 202 and release the pressure yet then close and stay closed to maintain the set pressure amount, and (C) "Release" or "Deflate" wherein the pressure will be released and the air or fluid within the bladder 202 released to deflate and this umbrella valve is always in the open position. In this embodiment (not shown) there are three umbrella valves with one set to always open the bladder 202 to release pressure completely, one set to always close to maintain air or fluid in the bladder 202 to maintain pressure, and a third set to open or release at a predetermined or set pressure point. In all of the embodiments referring to umbrella valve the umbrella valve may also be a switch (manual or otherwise) or a digital switch or any other known means to open, close or partial release air or fluid within a bladder and thereby maintain, change or release pressure therein.

The inventive therapeutic system 100 includes an inventive scaling means connected to the bladder 202, 302 so as to maintain the gradient compression profile and/or gradient pressure profile when the inflation means 150 is either disconnected from the therapeutic compression apparatus 200, 300 or the inflation means stops providing additional inflation or pressure. In one embodiment as shown in FIG. 2 the sealing means is a cap 211 which is inserted onto or into the inflation port 209, 309.

Figures 5A, 5B:
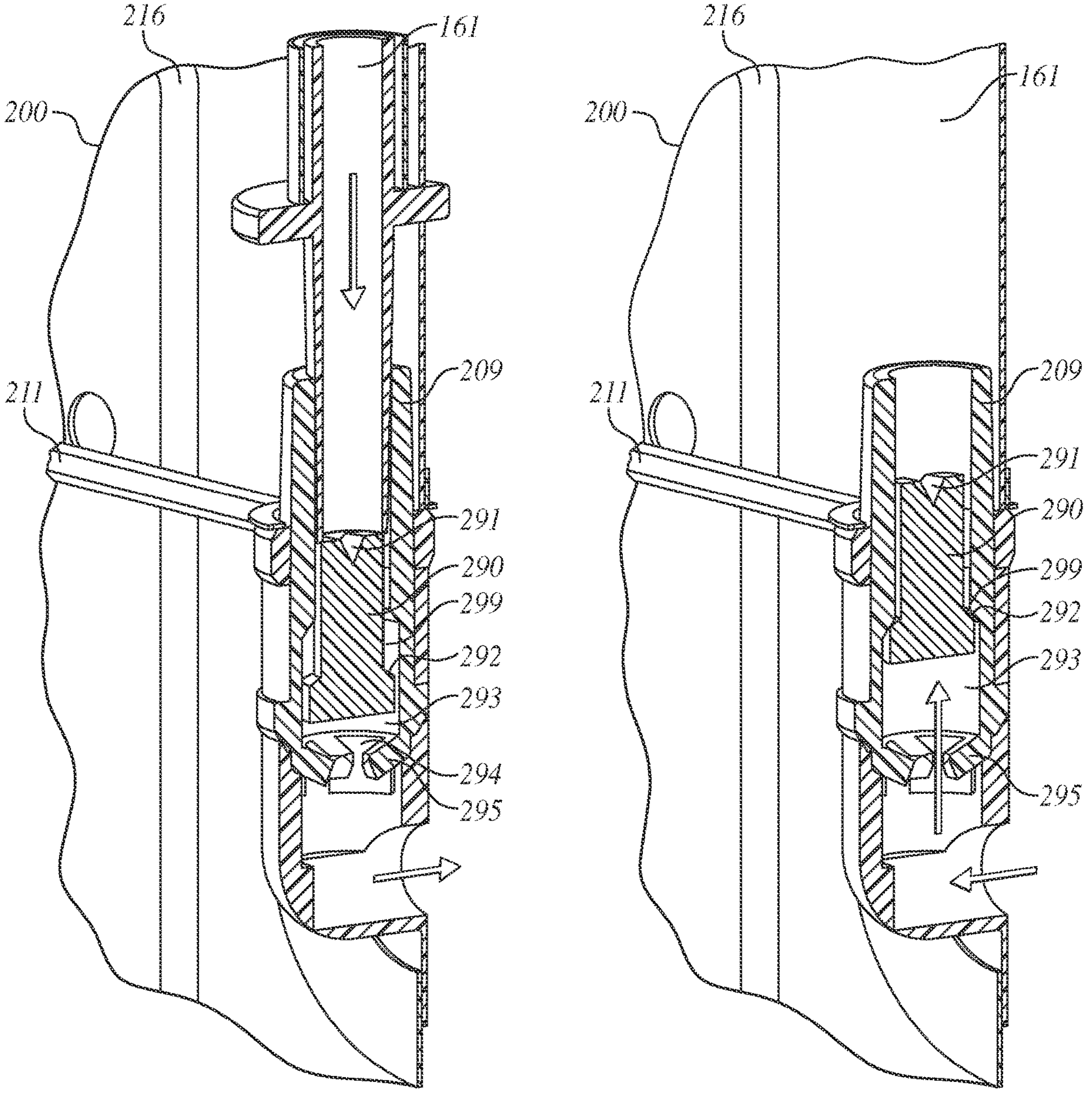
FIG. 5A is a cut away view of the inflation port of FIGS. 1 and 2 showing one embodiment of the self-sealing check valve in the open position as the bladder is being inflated.
FIG. 5B is a cut away view of the inflation port of FIGS. 1 and 2 showing one embodiment of the self-sealing check valve in the closed position to prevent deflation of the bladder once inflated.

The sealing means also includes a valve 290 within the inflation port 212, 312. As shown in FIGS. 5A-5B which is a cut-away of the inflation port 212, the valve 290 is located within a housing 209, the housing being tubing or for instance a luer. In this embodiment the housing 209 is a plastic female luer but other materials can be employed such as metal, polymers, or rubbers and other housing means can be employed. The valve 290 as shown in FIGS. 5A and 5B includes a V-notch 291 in the top proximal portion of the valve 290 though other shapes of notches or other apertures and openings may be employed. The V-notch 291 in this embodiment assists in movement of the fluid from the male luer 161 (fluid flowing from the inflation means 150) into the inflation port 212 and into the bladder 202. The bottom distal portion of the valve 290 is in a shape as shown in FIGS. 5A and 5B such as a plug where the top portion 291 is thinner than the bottom distal portion and has a location 292 which abuts and seals the inflation port when it rests along the top portion 299 of the indent 293 in the lower portion of the housing 209. When the two portions 292 and 299 are connected or touching, the inflation port 212 is sealed and the fluid within the therapeutic compression apparatus 200 is sealed within the bladder 202 and thus the pressure and compression within is sealed and if applicable the gradient compression profile and/or gradient pressure profile is maintained. As seen in FIGS. 5A and 5B, the housing 209 has a circumference which expands in a lower distal portion to house the valve 290. The shape as shown in FIGS. 5A and 5B is not limiting and any other shapes may be employed, as long as some portion of the valve 290 touches a portion of the housing 209 so as to create a sealing means and maintain the pressure and fluid within the inflated therapeutic compression apparatus 200, 300. Again other shapes may be employed such that the functionality is created for a scaling means. The bottom distal portion 295 of the housing 209 in this embodiment then narrows or tapers so that when the valve 290 is pushed down by the male luer 161 the bottom of the valve 290 rests on top of 295 and the fluid passes around the outer circumference of the valve 290 and also through the V-notch 291 and flows into the bladder 202 via the opening or aperture 294. The outer circumference of the bottom distal portion of the valve 290 is slightly smaller than the inner circumference of the bottom distal portion 293 of the housing 209 so that the fluid can flow from the inflation means 150 through the hose 160 through the slip luer 161 through the inflation port 212 and into the bladder 202. The same components and method may be employed in the thigh therapeutic compression apparatus 300 or any other type of inflatable apparatus.

FIG. 5A shows the inflation of the therapeutic compression apparatus 200 with the male slip luer 161 inserted within the housing 209 of the inflation port 212 (the optional cap 211 is open and off to the side) and pushes down on the valve 290 so that the valve 290 bottom rests on the bottom distal portion 295 of the housing which is referred to as the open position for the valve 290. The fluid represented by the downward arrow in the middle of the male slip luer 161 flows into the housing 209 and past the valve 290 and into the bladder 202 as shown by the arrow direction in the bottom of the figure. The fluid will continue to flow into the bladder 202 until such time as the therapeutic compression apparatus 200 is in the appropriate inflated state. The user then removes the male slip luer 161 inserted from the housing 209 of the inflation port 212 and the valve 290 moves in an upward direction so that the valve 290 bottom distal portion 292 touches the corresponding shape of the top portion 299 of the indent 293 in the lower portion of the housing 209. The two portions 292 and 299 are connected or touching thereby sealing the inflation port 212 and the fluid within the therapeutic compression apparatus 200 is maintained at the level prior to the inflation means 150 being disconnected to therapeutic compression apparatus 200. The fluid is represented by the upward arrow in the middle of the housing 209 flowing from the bladder 202 and into the bottom portion of the indented housing 293 is sealed by the valve 290. The inflation means 150 could be a manual pump 400 as well and any other static or intermittent inflation means. When the bladder 202 is deflated by the user the valve 290 will again be pushed down by the male slip luer 161 but no fluid or inflation will be employed at that time so that the fluid flows out of the inflation port past the valve 290 and the deflated state will be maintained. The valve 290 can be manually pushed down to deflate by inserting the male slip luer 161 or by a stem or other extending portion of the cap 211 (shown in FIG. 8K) or by any other appliance to push the valve 290 in a downward direction. In this embodiment the valve 290 is self-sealing but other sealing means can be employed such as any moveable lever, screw, switch, stop cock, or other mechanical means to seal the inflation port and maintain the fluid within.

The inventive system 100 may be included in a kit including a therapeutic compression apparatus 200, an inflation means 150, a retaining means 180 such as a belt, and a connecting means such as a tube 160. The inflation means 150 may require a charger depending on the source of energy, such as an electric charger (not shown) for connecting to the USI3 port 159 and the kit would include such a charger. As seen in FIG. 3, a cable such as a USB cable 175 may be connected to the USB port 159 to charge the inflation means and the USB cable 175 has two connectors 176, 177 on each side for connecting to a charging source and connecting to the inflation means 150. As seen in FIG. 3 an optional battery 173 may be connected to the inflation means 150 and worn by the user on the belt 180. In this embodiment the battery assembly 170 includes a battery 172 placed within a pouch 171 or any other housing means and the pouch 171 is slipped onto the belt 180 via two openings or apertures 172 located on the sides of the pouch 171. The USB cable 175 is then connected on one side 174B, 177 to the battery 173 and connected on the other side 176 to the inflation means 150 at the corresponding USB port 159. The inflation means 150 may already be fully charged but with the optional battery 171 the user can leave the confines of hospital bed, home, work and is ambulatory and able to continue inflation without being tethered to an electrical outlet.

Depending on the therapeutic compression apparatus 200 in the kit, a stocking, sock 220 or other layer between the patient's skins and the therapeutic compression apparatus 200 may be included. Depending on the embodiment of the inflation means 150, a flexible cover 158 may be included in the kit. Other devices or apparatus may be included in such a kit or for instance, replacement or spare connecting means such as tubes 160, spare batteries 171, spare USB cables 173 and the like The kit may also include various wound dressings and/or bandages. The wound dressings and/or bandages may be disposed of on a more frequent basis and the inventive therapeutic compression apparatus is applied in conjunction or combination with the wound dressings and/or bandages. In one embodiment the therapeutic compression apparatus is used over or on top of the wound dressing applied to the skin.

Another embodiment of the present invention includes a method of applying a measured compression amount with feedback. In this embodiment (not shown), Compression Bladder A is inflated by Inflation Source C—the nature of Compression Bladder A is such that the amount of compression is determined by the amount of inflation medium (typically air) pumped into A from C. In this design, Inflation Source C is also coupled with Bladder B, which has a fixed volume of air. When Compression Bladder A inflates, it will squeeze Bladder B as it compresses Compressed Item F. Inflation Source C is able to read the line pressure from the Coupling Line E to determine the interface pressure from Bladder B—in this design, Inflation Source C can be calibrated to provide only the amount of inflation medium necessary into Compression Bladder A as determined by matching the desired interface pressure from Bladder B. Other configurations may be employed so that feedback may be obtained from the inflation means and compression apparatus.

Figure 6:
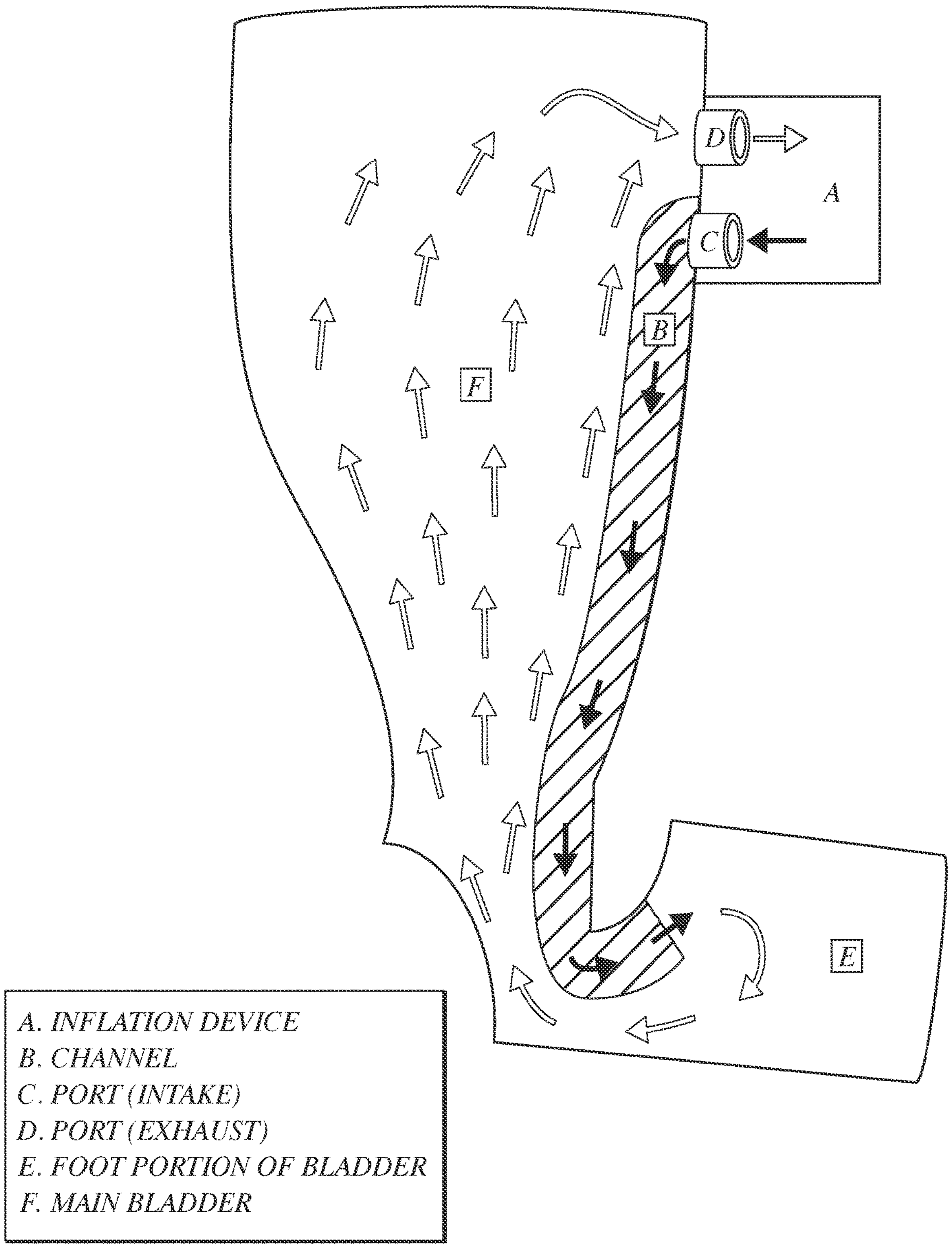
FIG. 6 is a further embodiment of a therapeutic compression apparatus wherein the inflation means is connected to an intake port and to a separate exhaust port of such therapeutic compression apparatus.

Another embedment of the present invention includes a Sequential Gradient Compression with Single Chamber. In such embodiment (shown as FIG. 6), the therapeutic compression apparatus 200 includes an inflation bladder to apply not only gradient compression but sequential (filling up either the channel B first and then filling up the main bladder F second, or the opposite) compression. In this embodiment (shown as FIG. 6), Inflation Device A is coupled to the device in two places (Intake Port C and Exhaust Port D). By inflating and providing air that goes directly into Channel B, the Channel B inflates first, before the Main Bladder F. Air then exits out of Exhaust Port D. In this design, the inflation can be intermittently provided for gradient and sequential compression or inflation can be held at a constant level to provide just the gradient profile.

The inflation means 150 may also include a sensor 155 to measure the air pressure being applied in the tube 160. Another embodiment of the present invention include an electric or other automated inflation means such that the bladder is inflated to a set volume or by reading the back pressure of which is being filled in. A pressure cycling function may be included. Further, an embodiment may have an inflation means such that the inflation maintains in the bladder(s) even after the inflation means is removed. Such inflation means may be integral to the compression apparatus itself or may be removable. Such inflation means may include an integrated circuit and/or wireless capability for tracking of usage, pressure, compliance by the patient in regard to maintaining certain pressures recommend by a physician or part of such patient's treatment plan, and other health data such as standing pressure and moving or working pressure, pedometer (number of steps), heartbeat, blood pressure and any other possible monitoring of the patient. Depending on the feedback obtained the inflation means may be programmed to increase or decrease the pressure without manual changing by the patient. Further, the inflation means may be configured so that the physician or other treatment professional may increase or decrease the pressure remotely based on the feedback. Other combinations may be included such as manual changing of the dial or inflation means in combination with automated means or electric means or digital means.

The system may also include other sensor such as a tonometer, which is a device pressed into the skin to measure the amount of force required to make an indent in the tissue. The resulting measurement can help gauge the degree of firmness or fibrosis (tissue scarring) under the skin, which is a consequence of worsening lymphedema. Such a tonometer could be applied to the patient's skin under the therapeutic compression apparatus 200 and measure the firmness or fibrosis at such treatment site on the limb of the patient. Such a tonometer could be connected to the inflation means via Bluetooth or other digital means and provide feedback to the patient and medial staff as discussed above.

In another embodiment, the inventive therapeutic compression system 100 has sensors that measure the positioning and movement of the therapeutic compression apparatus 200, 300. Such sensors could be interpreted to give readouts (via the interface, a plug-in to a computer, or sent to an app) to the user or clinician as to the compliance, activity (pedometer to measure steps, stairs climbed, etc.), and give advice/alerts to improve the treatment. In one such embodiment with sensors, the therapeutic compression apparatus 200, 300 would be programmed to automatically adjust the type and level of compression administered—for example, it is known in the art that while walking static compression is adequate for lower-leg compression therapy so if the sensors detect that the user is walking it would maintain a static, non-intermittent compression of the garment. If the sensor senses that the lower-leg is not walking and is at rest it could either alert the user to switch to intermittent compression or could automatically switch over to intermittent compression to promote blood flow. In one embodiment the sensors would be able to measure skin fibrosis and adjust the level of compression required to improve swelling reduction. These sensors listed are not limiting and any other known or future developed sensors could be employed with the inventive system.

The sensors described above are non-limiting and could be non-digital or digital means may also be employed. A motorized pump and digital display may be used. The valve may include digital or electric means to change or modify pressure at a set rate or intervals or based on feedback from the monitoring means. The system may include various sensors and monitors. Other sensors could be time set for instance if the system was rented so that the system would stop working once the sensor triggered that the rental days or rental hours had expired. In this instance, the sensor could be reset if additional rental time was purchased.

The inventive therapeutic compression system 100 may be used to treatment a patient post-operation, such as post-operative sclerotherapy procedures. Post-operative sclerotherapy treatment can also be effective with thigh therapeutic compression apparatus 300 wherein a lateral bladder is closed via a closing means (not shown) and either remains in a non-inflated state or may be slightly inflated to a lower pressure level, or could be inflated to any pressure level desire by the patient. In this embodiment, a medial bladder is inflated as part of the post-operative treatment plan to apply compression and pressure to the treatment site. Reference is made to U.S. patent application Ser. No. 16/846,211 filed on Apr. 10, 2020 which is incorporated herein. Other post-operative procedures may employ the same method.

The inventive therapeutic compression system may be used for other treatments such as lymphedema, CVI, DVT or any other vascular related issue. In use the therapeutic compression apparatus 200 may be placed by the patient, practioner or care-giver on the chosen limb, such as for instance the leg and fastened around the limb of the patient. Moving in an upward or downward position from the knee and/or hip and/or foot, the patient, practioner or care-giver fastens or secures the fastening tabs up or down to the limb. If there are additional optional straps located on the proximal end of the apparatus the first strap should be closed or secured in a tight fashion so that the therapeutic compression apparatus 200 fits snugly but not too tight and the second strap should be closed or secured in a tight fashion so that the therapeutic compression apparatus 200 fits snugly but not too tight. The patient, practioner or care-giver then removes the valve cap 211 from the valve located on the therapeutic compression apparatus 200 thus opening the inflation port 212, namely the female slip luer 209. The patient, practioner or care-giver then selects a pressure amount of value on the display 157 or dial of the inflation means 150 depending on the treatment and whether the patient will be walking, sitting, lying down or traveling in a vehicle, train or airplane. Once the pressure amount or value is chosen on the dial (such as a given pressure amount such as "35" mm-Hg or a text such as "Walk" or "Air" or "Travel" or "Low" or "Medium" or "High"), the corresponding umbrella valve or switch is activated such that the pressure is thereafter maintained (closed position) or modified so as to maintain the pressure as it changes with the activity or altitude when in use). The patient, practioner or care-giver then inserts an end of the tube 160 portion such as the male luer slip 161 into the inflation port 112 on the therapeutic compression apparatus 200, presses the ON-OFF button 149 of the inflation means 150 or uses the hand pump 165, and the air or fluid is increased to inflate the bladder 202 and thus achieve a desired pressure amount or valve. Again this inflation means may be a hand pump, electric pump, battery-operated pump, remote controlled pump, air pump, gas pump, or any other known inflation means. A number or variety of inflation means can be employed such as a manual pump, hand pump, foot pump, mechanical pump, electrical pump, battery-operated pump, static pump, intermittent pump, varying pump, automatic pump, pneumatic pump, negative pressure pump, suction pump or vacuum, pulsing pump, or any other known or developed source of inflation so as to provide a certain pressure within the bladder so to provide compression in use by the patient. Depending on the inflation means employed such inflation means may be removed and the valve cap replaced and the pressure will not decrease except as noted in the "Air" or "Walk" position. At any point in use the patient, practioner or care-giver can deflate the bladder by either inserting the valve cap so it depresses the valve spring and thus release the air or fluid in the bladder and decrease the pressure, or the patient, practioner or care-giver can reinsert the inflation means and select the "Deflate" or "Release" and the corresponding umbrella valve will be in the open position so as to release the air or fluid in the bladder and decrease the pressure until a deflated state is achieved for the bladder and the therapeutic compression apparatus. The therapeutic compression apparatus can be reinflated and deflated over and over again when in use.

The method of use of the inventive system is also described in FIGS. 7A-C and 8A-8K. The present invention has been illustrated and described with respect to specific embodiments thereof, which embodiments are exemplary and illustrative of the principles of the invention and are not intended to be exclusive or otherwise limiting embodiments. For instance, while in the foregoing embodiments the therapeutic compression apparatus 200 are described as having inflatable bladders, the therapeutic compression apparatus 2000 may additionally include integrally formed or attached (e.g., by adhesive, radio-frequency welding, etc.) compression members that are not configured for inflation and/or deflation. For instance, additional compression members may be implemented using any of a variety of preformed and/or prefilled cushioning materials such as foam cushions and/or air, gel, or other fluid filled non-inflatable cushions, provided such compression members generate sufficient compression in combination with integral compression bladders. Further, while particular shapes, sizes, and materials have been described for purposes of illustration, it will be recognized that any of a variety of shape or size can be used, and the materials described are not exclusive but merely illustrative. Also, as noted above, while the bladder shown is inflated with air, it will be appreciated that any other fluid or medium such as liquid or gel can be used. Moreover, as also noted, it will be understood that bladders may be configured to have multiple pneumatically independent and/or pneumatically coupled bladder sections, and may also be configured to have various contours or lobulations.

The inventive therapeutic compression system 100 described herein can be used for any suitable condition treatable by compression therapy and the like. For example, the inventive system including a therapeutic compression apparatus 200 in accordance with the present invention can be used for compression of the venous system for the treatment of swelling, venous ulcers, CVI, DVT, for the treatment of lymphedema (where it is circulation of fluids in the lymph system rather than in the venous system that is promoted), and the like.

As shown in FIGS. 7A-20C, the method of use could include two therapeutic compression apparatus connected to one inflation means. In this example, the thigh therapeutic compression apparatus 300 and the lower leg therapeutic compression apparatus 200 are each separately connected to the inflation means via two tubes or hoses, each tube connected on one end to a therapeutic compression apparatus and the other end to the inflation means. The method includes wherein (1) the lower leg therapeutic compression apparatus 200 is inflated first and holds at a determined pressure level, then (2) the thigh therapeutic compression apparatus 300 is inflated and holds at a determined pressure level, then (3) the thigh therapeutic compression apparatus 300 is deflated either entirely or just to a lower pressure level, and thereafter (4) the lower leg therapeutic compression apparatus 200 is deflated either entirely or just to a lower pressure level. In this example the pressure level could be either constant static status or an intermittent varying pressure status. Further, in this example the pressure levels can be either the same or different or the line pressure can be the same but the interface pressure can be adjusted with the shaping of each of the bladders (whether shape or combination of spot welds and/or line welds to form a gradient pressure profile).

As shown in FIGS. 20B-20C, another embodiment of the method of use includes one inflation means, one tube or hose connected to the inflation means and the first therapeutic compression apparatus (in this instance the lower leg therapeutic compression apparatus 200), a second tube connected to the first and second therapeutic compression apparatus (in this instance a thigh therapeutic compression apparatus 300). In this example, the thigh therapeutic compression apparatus 300 and the lower leg therapeutic compression apparatus 200 are connected to the other via a tube or hose and one therapeutic compression apparatus (in this instance the lower leg therapeutic compression apparatus 200) is connected to the inflation means via a separate second tube or hose. The method as shown includes wherein (1) the lower leg therapeutic compression apparatus 200 is inflated first and holds at a determined pressure level, then (2) the thigh therapeutic compression apparatus 300 is inflated and holds at a determined pressure level which inflation is administered via a tube or hose connecting the thigh therapeutic compression apparatus 300 and the lower leg therapeutic compression apparatus 200, then (3) the lower leg therapeutic compression apparatus 200 and the thigh therapeutic compression apparatus 300 are deflated at the same time (either entirely or just a lower pressure level. In an alternate method (not shown), after inflation steps (1) and (2) then (3) the thigh therapeutic compression apparatus 300 is deflated either entirely or just to a lower pressure level, and thereafter (4) the lower leg therapeutic compression apparatus 200 is deflated either entirely or just to a lower pressure level. In yet another alternate method (not shown), after inflation steps (1) and (2) then (3) the lower leg therapeutic compression apparatus 200 is deflated either entirely or just to a lower pressure level, and thereafter (4) the thigh therapeutic compression apparatus 300 is deflated either entirely or just to a lower pressure level. In all of these examples of FIGS. 7A-7C the pressure level could be either constant static status or an intermittent varying pressure status. Further, in this example the pressure levels can be either the same or different or the line pressure can be the same but the interface pressure can be adjusted with the shaping of each of the bladders (whether shape or combination of spot welds and/or line welds to form a gradient pressure profile). Finally, the order of first inflation could be reversed in that the tube from the inflation means could be connected to the thigh therapeutic compression apparatus 300 and then a tube connects the thigh therapeutic compression apparatus 300 and the lower leg therapeutic compression apparatus 200 so that the thigh therapeutic compression apparatus 300 is inflated first, followed by the lower leg therapeutic compression apparatus 200 and then the lower leg therapeutic compression apparatus 200 is deflated (partially or entirely) followed by deflation of the thigh therapeutic compression apparatus 300. Other variations may be made if the first therapeutic compression apparatus is an arm or hip or torso therapeutic compression apparatus followed by the thigh therapeutic compression apparatus 300 or a lower leg therapeutic compression apparatus 200 and any other combination of another limb therapeutic compression apparatus.

Figure 7A:
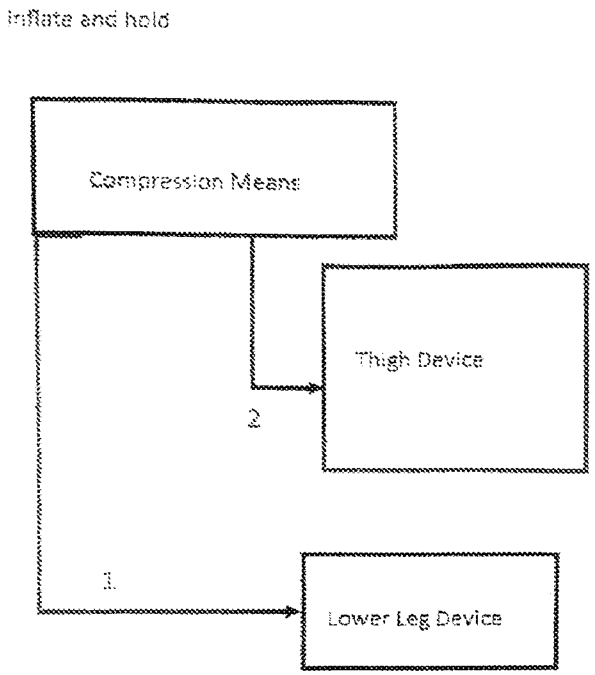
FIGS. 7A-7E are an embodiments of the flow representation of the methods of use of the inventive system including a lower leg therapeutic compression apparatus and a thigh therapeutic compression apparatus.
Figure 7B:
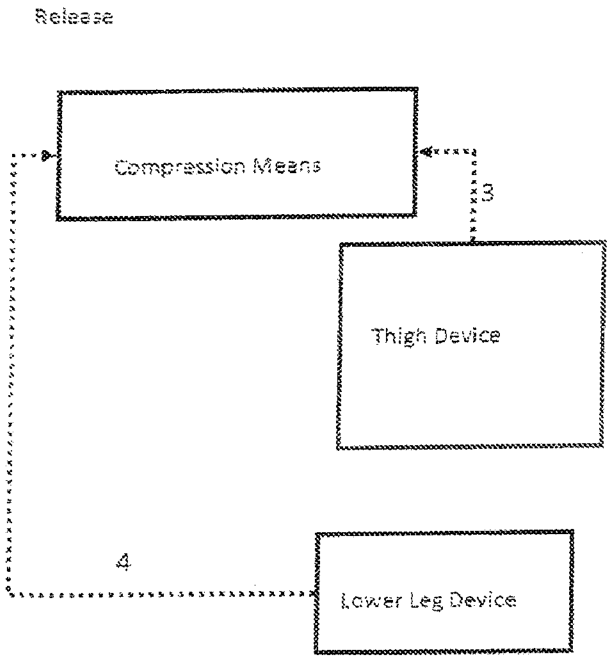
Figure 7C:
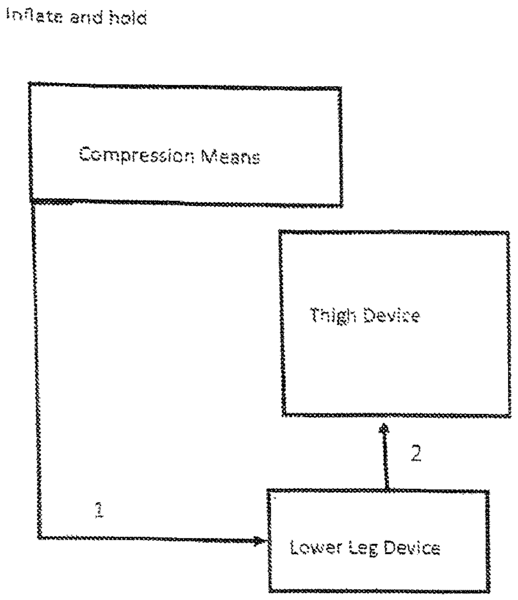
Figure 7D:
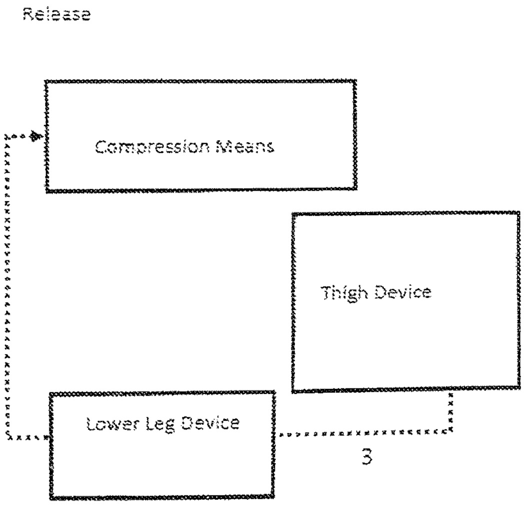
Figure 7E:
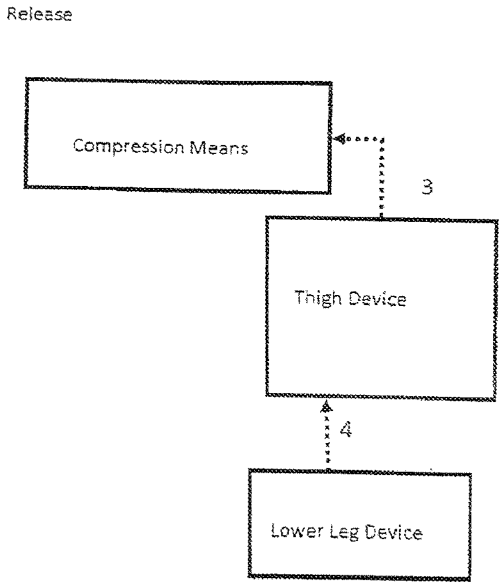
Figures 8A, 8B, 8C, 8D, 8E, 8F:
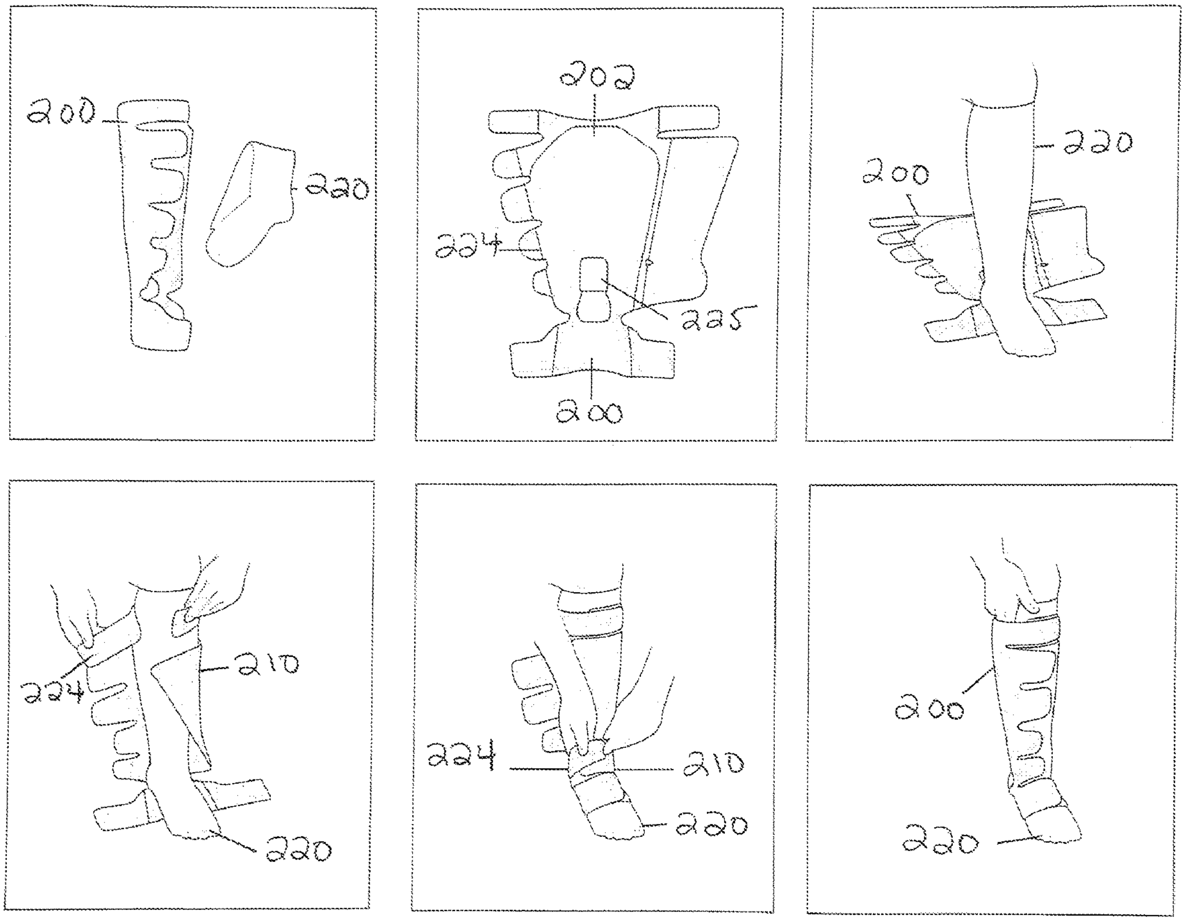
FIGS. 8A-8K are yet another embodiment of the flow representation of the method of use of the inventive system including a lower leg therapeutic compression apparatus.
Figure 8G:
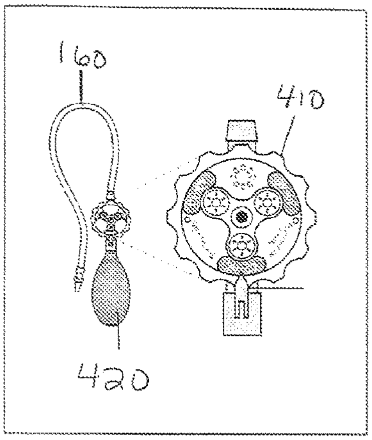
Figure 8H:
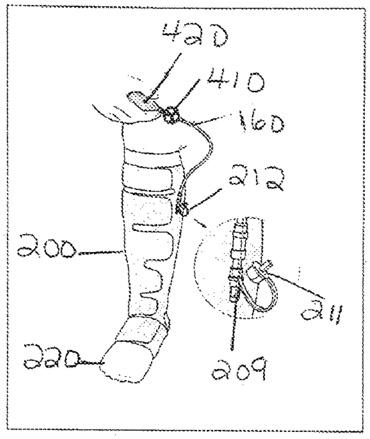
Figure 8I:
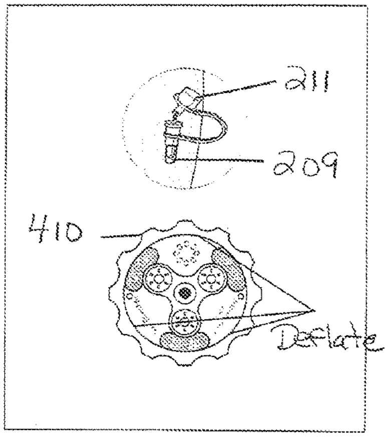
Figure 8J:
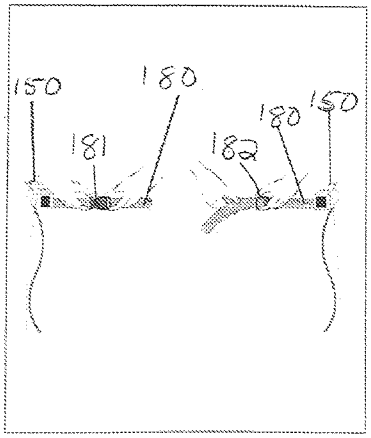
Figure 8K:
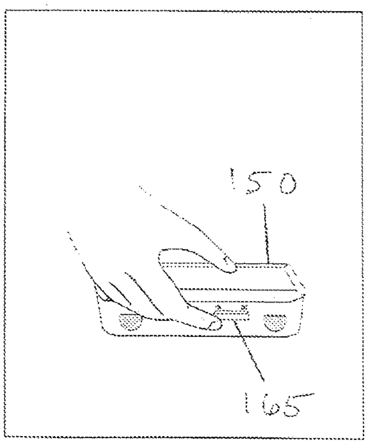

As shown in another embodiment of the method of use includes one inflation means, one tube or hose connected to the inflation means and the first therapeutic compression apparatus (in this instance the lower leg therapeutic compression apparatus 200), a second tube connected to the first and second therapeutic compression apparatus (in this instance a thigh therapeutic compression apparatus 300) and then a tube or hose connected to an exhaust port in the inflation means and the second therapeutic compression apparatus (in this instance a thigh therapeutic compression apparatus 300). In this example, the thigh therapeutic compression apparatus 300 and the lower leg therapeutic compression apparatus 200 are connected to the other via a tube or hose and one therapeutic compression apparatus (in this instance the lower leg therapeutic compression apparatus 200) is connected to the inflation means via a separate second tube or hose and a third tube or hose connects the second therapeutic compression apparatus (in this instance the thigh therapeutic compression apparatus 300) to the inflation means or an exhaust port. The method as shown in FIGS. 7A-7C includes wherein (1) the lower leg therapeutic compression apparatus 200 is inflated first and holds at a determined pressure level, then (2) the thigh therapeutic compression apparatus 300 is inflated and holds at a determined pressure level which inflation is administered via a tube or hose connecting the thigh therapeutic compression apparatus 300 and the lower leg therapeutic compression apparatus 200, then (3) the thigh therapeutic compression apparatus 300 is deflated (either entirely or just a lower pressure level) via a tube or hose connected to an exhaust port or release port in the inflation means and thereafter (4) the lower leg therapeutic compression apparatus 200 is deflated (either entirely or just a lower pressure level). In an alternate method (not shown), after inflation steps (1) and (2) then (3) the lower leg therapeutic compression apparatus 200 is deflated either entirely or just to a lower pressure level, and thereafter (4) the thigh leg therapeutic compression apparatus is deflated either entirely or just to a lower pressure level. In yet another alternate method (not shown), after inflation steps (1) and (2) then (3) the lower leg therapeutic compression apparatus 200 and the thigh therapeutic compression apparatus 300 are both deflated at the same time, either entirely or just to a lower pressure level. While in this example of the method of use the second therapeutic compression apparatus is connected to an exhaust port or release port in the inflation means, other embodiments may employ an exhaust port or release port integral to the therapeutic compression apparatus themselves, such as part of or near the inflation port 212, 312 in a therapeutic compression apparatus 200, 300. In all of these examples of FIGS. 7A-7C the pressure level could be either constant static status or an intermittent varying pressure status. Further, in this example the pressure levels can be either the same or different or the line pressure can be the same but the interface pressure can be adjusted with the shaping of each of the bladders (whether shape or combination of spot welds and/or line welds to form a gradient pressure profile). Finally, the order of first inflation could be reversed in that the tube from the inflation means could be connected to the thigh therapeutic compression apparatus 300 and then a tube connects the thigh therapeutic compression apparatus 300 and the lower leg therapeutic compression apparatus 200 so that the thigh therapeutic compression apparatus 300 is inflated first, followed by the lower leg therapeutic compression apparatus 300 and then the lower leg therapeutic compression apparatus 200 is deflated (partially or entirely) followed by deflation of the thigh therapeutic compression apparatus 300. Other variations may be made if the first therapeutic compression apparatus is an arm or hip or torso therapeutic compression apparatus followed by the thigh therapeutic compression apparatus 300 or a lower leg therapeutic compression apparatus 200 and any other combination of another limb therapeutic compression apparatus.

As shown in FIGS. 8A-8K, a method of use of the inventive therapeutic system 100 is shown in one embodiment where the user takes the lower leg therapeutic compression apparatus 200 and the sock 220 and places the sock 220 on the lower leg. The user then connects the upper part of the hook and loop 210, 224 followed by the foot portion 210, 224 and then the middle of the lower leg 210, 224. The user checks to make sure there is room for inflation and gradient compression such as places two fingers between the sock 220 and the therapeutic compression apparatus 200. The user then chooses either the inflation means 150 of powered pump 165 or a manual hand pump 400. If choosing the manual pump the user chooses the pressure range on the dial 4410, inserts the male slip luer 161 into the inflation port 212, specifically the female luer 209, and then pumps the bulb 420 until the therapeutic compression apparatus is inflated and then removes the male slip luer 161 which triggers the valve 290 to move in an upward direction and seals the bladder 202. If choosing the pump 156 in this embodiment the user puts on the securing means of the belt 180, adjusts it using the adjusters 182, and then buckles it using 185A, 185B. The user then opens the cap 211 and inserts male slip luer 161 into the inflation port 212, specifically the female luer 209, and then presses the pump 156 on, possibly choosing a set pressure amount (static or intermittent) and once the therapeutic compression apparatus is inflated, removes the male slip luer 161 which triggers the valve 290 to move in an upward direction and seals the bladder 202. In both instances the user can place the cap 211 on top of the female slip luer 209 to further seal the bladder 202. To deflate, the user then can remove the cap 211, invert it and push the stem into the female slip luer 209 to release the seal and deflate the bladder 202, The user can also deflate using the hand pump dial 410 or putting the pump 156 off or set to a deflate position on the pump 156. Other methods of inflation and deflation may also be employed.

As stated herein, the possible therapeutic compression apparatus to be used in the inventive system are only limited to the target limbs or body parts to be compressed or subject to pressure treatments in order to reduce and treat swelling, lymphedema, CVI, DVT or any other medical issue. For instance, the therapeutic compression apparatus could be for a foot, ankle, calf, lower leg, knee, thigh, groin, hip, buttocks, torso, stomach, back, shoulder, chest, arm, elbow, wrist, hand, neck, head, or the like and any combinations thereof. The inventive system of the instant invention described herein solves many problems with the prior art and in the industry and treatment of patients. The therapeutic compression apparatus 200, 300 may be applied on the patient's body part by the patient without the need or requirement of a skilled care-giver as required by current devices and apparatus. It further is capable of maintaining sufficient effective pressure without overpressure complications, maintaining compression and the like.

The therapeutic compression apparatus 200 of the instant invention of the therapeutic compression system 100 includes a universal inflation port which is configured to be capable of connecting to more than one source of compression or inflation means such that the patient could vary treatment through varying the inflation source and inflation means for the treatment apparatus or device. For instance, a patient using the therapeutic compression apparatus 200 of the instant invention can alternate between a manual or mechanical or electrical inflation means or source of inflation and pressure. Further, the patient can alternate between static or intermittent inflation and pressure when using the inventive system and inflation means 150 pumps.

The inventive therapeutic compression system 100 also reduces the problem of lack of mobility in that the inflation means is not integral to the therapeutic compression apparatus and instead the patient can walk about and go to work, school, recreational activities. The inventive system includes an inflation means which is not tethered to a wall outlet and instead is a main pump which is configured to either apply constant static pressure at one pressure level, or constant at static pressure at a choice of different pressure levels, or intermittent pressure at one level, or intermittent pressure at multiple pressure levels, or a choice of either constant static pressure level and intermittent pressure levels. The ability to switch between pressure levels and/or switch between constant static pressure and intermittent pressure promotes a more effective treatment for CVI, DVT and/or lymphedema and other treatments.

Another embodiment (not shown) may include a variety of sensors so that the pump on its own may adjust the pressure level or switch from intermittent pressure level (which the patient is sitting or the leg is elevated) to constant static pressure (when the patient is walking or running). Such sensors may be connected to a database accessible by a medical provider which could remotely adjust the pressure levels or status change from intermittent to constant or the reverse.

The inventive system may be used as a prophylaxis or as part of a treatment plan which is easy for the patient to use at home or work (outside a hospital setting or with the aid of a medically trained professional as noted above) which is ambulatory so that the patient can walk and return to life activities. The inventive system can be used as a prophylaxis for swelling in any body part. The system can also be used in pre-operative and post-operative treatments for many different surgeries including but not limited to knee surgeries, hip surgeries, TKR, KRA, TEM, HRA, sclerotherapy and many other surgical procedures regarding other libs or body parts which could have an increased risk of CVT and/or DVT. The inventive system may be used to prevent, reduce or even treat DVT and the system is practical to use, mobile and easy to be administered by the patient post-operative total knee replacement of any other knee, hip or leg surgery. Further the inventive system could also be used in HPIPC treatment and this inventive system can be easily administered by a patient in the home setting as well as a rehabilitation setting or nursing home setting.

The inventive system includes an inflation means which is less bulky than known systems. The user can thus return to life activities sooner than with known compression systems, prophylaxis systems and other treatment systems which limit the user's ambulation both within and outside the home due to power constraints (electrical, mechanical, battery, manual, etc.) on the system. Further, the inventive system may include one or more sensors to measure the user's limb in regard to pressure on the skin, motion of the limb, blood pressure, tonometer sensor, GPS sensor, and the like while the system is in use. Such sensors may be connected to the inflation means so as to regulate the pressure from the inflation means and either increase or decrease the current pressure level(s). Such sensors may also be connected to a database and possibly accessible to a medical professional and/or the user in real time or as saved over time.

Additionally the system incudes multiple of compression garments which each therapeutic compression apparatus may have separate active pressure levels at the same time or can vary over time and based on the user's activities.

While the subject invention of the present disclosure has been described with respect to preferred and exemplary embodiments, those skilled in the art will readily appreciate that various changes and/or modifications can be made to the invention without departing from the spirit or scope of the invention as described herein. There have been described and illustrated herein several embodiments of an intermittent pressure apparatus and a method of installing and operating same. While particular embodiments of the invention have been described, it is not intended that the invention be limited thereto, as it is intended that the invention be as broad in scope as the art will allow and that the specification be read likewise. Thus, while particular shapes and sizes of inflatable bladders and straps have been disclosed, it will be appreciated that other shapes, sizes, and attachment means may be used as well. It will also be understood that while Velcro and adhesive means have been disclosed for helping to secure the bladders to the leg and foot, other types of attachments such as hooks, snaps, or wraps may be used. In addition, it will be appreciated that while the fluid conduit may be detachably connected to the bladders using mating threaded portions or bayonet locks, other means of attachment known in the art may be used. It will therefore be appreciated by those skilled in the art that yet other modifications could be made to the provided invention without deviating from its spirit and scope as claimed.

We claim:

1. A therapeutic compression system for applying pressure to a part of the human body, comprising:

at least one wrap configured to be worn on a part of a user including at least one bladder connected to a universal inflation port configured to be capable of connection to a static or intermittent inflation means at a top portion of the universal inflation port;

a static or intermittent inflation means connected to the at least one bladder via the universal inflation port wherein the inflation means includes a check valve and the universal inflation port includes a pneumatic self-sealing check valve within the universal inflation port; and wherein the universal inflation port pneumatic self-sealing check valve is configured to include an open position and a closed position wherein the open position allows air, gas or fluid to flow from the inflation means into the at least one bladder until the at least one bladder reaches a selected inflated state so that the at least one bladder is in the same inflation state as the inflation means while allowing excess air, gas or fluid to escape within the pneumatic self-sealing check valve to prevent overinflation of the at least one bladder at the selected inflated state such that the excess air, gas or fluid flows out of a top portion of the universal inflation port, and wherein the closed position maintains the at least one bladder in the selected inflated state when decoupled from the inflation means.

2. The therapeutic compression system of claim 1 wherein the inflation means is selected from the group consisting of manual pumps, static pumps, intermittent pumps, electrical inflation pumps, battery inflation pumps, gas powered inflation pumps, static pneumatic compression pumps, intermittent pneumatic inflation pumps, and the combinations thereof and the inflation means for the at least one bladder is selected from the group consisting of air, gas, fluid or combinations thereof.

3. The therapeutic compression system of claim 1 wherein the inflation means incudes a manual pump configured to provide static inflation.

4. The therapeutic compression system of claim 1 wherein the inflation means includes a powered pump configured to provide static and/or intermittent inflation.

5. The therapeutic compression system of claim 1 wherein the inflation means is connected to a securing means configured to be worn on the body of a user.

6. The therapeutic compression system of claim 1 wherein the pneumatic self-sealing check valve is selected form the group consisting of valves, caps, levers, switches, screws, stop tabs, stopcocks, or combinations thereof.

7. The therapeutic compression system of claim 1 further comprising a valve cap wherein the valve cap is capable of releasing a pressure created by the inflation means within the at least one bladder.

8. The therapeutic compression system of claim 1 further comprising a pressure sensor operatively connected to the inflation means to protect from over inflation and wherein the inflation means check valve is set to open at a predetermined pressure or an user selectable pressure.

9. The therapeutic compression system of claim 1 wherein the at least one wrap may be configured to wrap around a limb of the user wherein the limb is selected from the group consisting of the foot, ankle, calf, lower leg, knee, thigh, upper leg, whole leg, waist, torso, chest, arm, shoulder, elbow, wrist, hand, neck or any combinations thereof.

10. The therapeutic compression system of claim 1 further comprising a second wrap configured to wrap around a second limb of the user wherein the limb is selected from the group consisting of the foot, ankle, calf, lower leg, knee, thigh, upper leg, whole leg, waist, torso, chest, arm, shoulder, elbow, wrist, hand, neck or any combinations thereof.

11. The therapeutic compression system of claim 10 wherein the first wrap and second wrap are not connected to each other when connected to the same inflation means and wherein the second wrap has a different pressure reading than the pressure reading of the first wrap when both the first wrap and second wrap are inflated from the same inflation means.

12. The therapeutic compression system of claim 1 wherein the at least one wrap includes at least two bladders configured to be either separate or joined.

13. The therapeutic compression system of claim 12 wherein the second bladder has a different inflation pressure than the inflation pressure of the first bladder when both the first wrap and second wrap are inflated from the same inflation means.

14. The therapeutic compression system of claim 1, wherein the at least one bladder is an air bladder configured to have at least one chamber capable of sequential gradient pressure when connected to the inflation means.

15. The therapeutic compression system of claim 14, wherein the at least one wrap is configured to provide gradient compression profile when inflated by the inflation means.

16. The therapeutic compression system of claim 1, wherein the inflation means includes a three-way switch configured to be capable of holding a pressure created by the inflation means within the at least one bladder creating an inflated state of the at least one bladder, capable of releasing a set amount of pressure within the at least one bladder creating a partially inflated state of the at least one bladder, and capable of releasing all the pressure within the at least one bladder so as to create a fully deflated state of the at least one bladder.

17. The therapeutic compression system of claim 1, wherein the inflation means includes a real-time pressure measurement mechanism.

18. A method of applying compression pressure to a portion of a human body, comprising:

placing an at least one wrap on a body part of a user, wherein the at least one wrap includes (a) at least one bladder connected to an inflation means and (b) an universal inflation port having a pneumatic self-sealing check valve configured to include an open position and a closed position wherein the open position allows air, gas or fluid to flow from the inflation means into the at least one bladder until the at least one bladder reaches a selected inflated state so that the at least one bladder is the same inflation states as the inflation means while allowing excess air, gas or fluid to escape within the pneumatic self-sealing check valve to flow out of a top portion of the universal inflation port to prevent over-inflation of the at least one bladder at the selected inflated state, and wherein the closed position maintains the at least one bladder in the selected inflated state when decoupled from the inflation means and the universal inflation port includes a valve cap wherein the valve cap is capable of releasing a pressure created by the inflation means within the at least one bladder;

securing the inflation means to the same or different body part of a user;

activating the inflation means;

walking such that the at least one wrap is secure and stable on the body part;

removing the inflation means from the universal inflation port; and activating the pneumatic self-sealing means on the universal inflation port.

19. The method of claim 18 further including the step of deflating the inflated at least one bladder by opening the pneumatic self-sealing check valve and releasing a pressure within the at least one bladder.

20. A therapeutic compression system comprising:

at least one wrap having a proximal end configured to be located along a hip, groin or knee area of a user and a distal end of the primary wrap configured to be located at a knee or ankle of a user, the primary wrap including at least one bladder;

a secondary wrap having a proximal end and a distal end wherein the proximal end of the secondary wrap is connected to the distal end of the primary wrap;

an inflation means connected to the bladder via a universal inflation port on the at least one bladder wherein the universal inflation port includes a pneumatic self-check valve and is configured to be capable of connection to a manual or powered pump at a top portion of the universal inflation port and further configured to include an open position and a closed position wherein the open position allows air, gas or fluid to flow from the inflation means into the at least one bladder until the at least one bladder reaches a selected inflated state so that the at least one bladder is the same inflation states as the inflation means while allowing excess air, gas or fluid to escape within the pneumatic self-sealing check valve to flow out of the top portion of the universal inflation port to prevent overinflation of the at least one bladder at the selected inflated state, and wherein the closed position maintains the at least one bladder in the selected inflated state when decoupled from the inflation means; and an assembly comprising: a) a pre-filled air bladder attached to an absorbent foam, sponge or dressing configured for placement on a user's body under the therapeutic compression system; and b) a suction conduit in fluid communication with the absorbent foam, sponge or dressing and adapted for coupling to a source of negative pressure.

* * * * *